(12) United States Patent
Sugio et al.

(10) Patent No.: US 9,300,943 B2
(45) Date of Patent: Mar. 29, 2016

(54) IMAGE CODING METHOD, IMAGE DECODING METHOD, IMAGE CODING APPARATUS, AND IMAGE DECODING APPARATUS

(75) Inventors: Toshiyasu Sugio, Osaka (JP); Takahiro Nishi, Nara (JP); Youji Shibahara, Osaka (JP); Hisao Sasai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 345 days.

(21) Appl. No.: 13/978,597

(22) PCT Filed: Jan. 11, 2012

(86) PCT No.: PCT/JP2012/000108
§ 371 (c)(1),
(2), (4) Date: Jul. 8, 2013

(87) PCT Pub. No.: WO2012/096164
PCT Pub. Date: Jul. 19, 2012

(65) Prior Publication Data
US 2013/0293676 A1 Nov. 7, 2013

Related U.S. Application Data

(60) Provisional application No. 61/431,871, filed on Jan. 12, 2011.

(51) Int. Cl.
*H04N 19/46* (2014.01)
*H04N 19/52* (2014.01)
*H04N 13/00* (2006.01)
*H04N 19/597* (2014.01)

(52) U.S. Cl.
CPC ........... *H04N 13/0048* (2013.01); *H04N 19/52* (2014.11); *H04N 19/597* (2014.11); *H04N 19/46* (2014.11)

(58) Field of Classification Search
None
See application file for complete search history.

(56) References Cited

U.S. PATENT DOCUMENTS 8,873,633 B2 * 10/2014 Lee et al. ................. 375/240.16
2005/0053293 A1 * 3/2005 Lin et al. ....................... 382/236
(Continued)

FOREIGN PATENT DOCUMENTS

| JP | 2004-215229 | 7/2004 |
| JP | 2007-504760 | 3/2007 |
| WO | 2005/027497 | 3/2005 |

OTHER PUBLICATIONS

Jung et al., "Competition-Based Scheme for Motion Vector Selection and Coding," ITU-T Document VCEG-AC06, Jul. 2006, pp. 1-7.*

(Continued)

*Primary Examiner* — Jay Patel
*Assistant Examiner* — Reza Aghevli
(74) *Attorney, Agent, or Firm* — Wenderoth, Lind & Ponack, L.L.P.

(57) ABSTRACT

An image coding method is provided which enables prediction of a motion vector with high accuracy and coding of an image with high coding efficiency. The image coding method includes: calculating a disparity motion vector predictor for predicting a motion vector of a current block to be coded, from a motion vector of a disparity block; selecting a motion vector predictor for use in the prediction of the motion vector of the current block from among one or more motion vector predictor candidates including the disparity motion vector predictor; and coding (i) identification information corresponding to the motion vector predictor selected from among the one or more motion vector predictor candidates and (ii) a motion vector difference that is a difference between the motion vector of the current block and the motion vector predictor.

20 Claims, 37 Drawing Sheets

(56) References Cited

U.S. PATENT DOCUMENTS

| | | | |
|---|---|---|---|
| 2005/0141612 A1* | 6/2005 | Abe et al. | 375/240.16 |
| 2006/0245497 A1* | 11/2006 | Tourapis et al. | 375/240.16 |
| 2007/0154103 A1* | 7/2007 | Au et al. | 382/236 |
| 2008/0043845 A1* | 2/2008 | Nakaishi | 375/240.16 |
| 2009/0010323 A1* | 1/2009 | Su et al. | 375/240.01 |
| 2009/0168884 A1* | 7/2009 | Lu et al. | 375/240.16 |
| 2009/0279608 A1* | 11/2009 | Jeon et al. | 375/240.16 |
| 2010/0220790 A1* | 9/2010 | Jeon et al. | 375/240.16 |
| 2010/0309294 A1* | 12/2010 | Ihara et al. | 348/51 |

OTHER PUBLICATIONS

Panusopone et el., "Coding Tools in MPEG-4 for Interlaced Video," IEEE Trans. on Circuits and Systems for Video Technology, vol. 16, No. 5, Aug. 2000, pp. 755-766.*

International Search Report issued Apr. 17, 2012 in corresponding International Application No. PCT/JP2012/000108.

"Advanced video coding for generic audiovisual services", ITU-T Recommendation H. 264, Mar. 2010.

Joel Jung et al., "Competition-Based Scheme for Motion Vector Selection and Coding", ITU-Telecommunications Standardization Sector Study Group 16 Question 6 Video Coding Experts Group (VCEG), VCEG-AC06, 29th Meeting: Klagenfurt, Austria, Jul. 17-18, 2006.

Krit Panusopone et al., "Coding Tools in MPEG-4 for Interlaced Video", IEEE Transactions on Circuits and Systems for Video Technology, Aug. 2000, vol. 10, No. 5, pp. 755-766.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q. 6), JVT-D056, 4th Meeting: Klagenfurt, Austria, Jul. 22-26, 2002.

* cited by examiner

| Motion vector predictor index | Motion vector predictor candidate |
|---|---|
| 0 | Median(MV_A, MV_B, MV_C) |
| 1 | MV_A |
| 2 | MV_B |
| 3 | MV_C |
| 4 | Temporal direct vector |
| 5 | Disparity motion vector predictor |

FIG. 11

| Motion vector predictor index | Allocation bit string |
|---|---|
| 0 | 0 |
| 1 | 10 |
| 2 | 110 |
| 3 | 1110 |
| 4 | 11110 |
| 5 | 111110 |

Additional motion vector predictor candidates

Slice header

Stream of TS packets

TS header (4 Bytes)   TS payload (184 Bytes)

Stream of source packets

TP_extra_header (4 Bytes)   TS packet (188 Bytes)

Multiplexed data

SPN 0 1 2 3 4 5 6 7 ...

Source packet

FIG. 37

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, AND IMAGE DECODING APPARATUS

This application is the National Stage of International Application No. PCT/JP2012/000108, filed Jan. 11, 2012, which claims the benefit of U.S. Provisional Application No. 61/431,871, filed Jan. 12, 2011.

TECHNICAL FIELD

The present invention relates to an image coding method for coding an image on a block-by-block basis, and an image decoding method for decoding an image on a block-by-block basis.

BACKGROUND ART

An image coding apparatus compresses an amount of information generally using redundancy in a spatial direction and a temporal direction held by an image (including a still picture and video). Conversion into a frequency region is used as the method of using the redundancy in the spatial direction. Inter prediction is used as the method of using the redundancy in the temporal direction. The inter prediction is also called inter picture prediction.

When coding a picture, the image coding apparatus which employs the inter prediction uses, as a reference picture, a coded picture that precedes or follows, in display order, a current picture to be coded. Then the image coding apparatus derives a motion vector by motion estimation on the current picture with respect to the reference picture.

Next, the image coding apparatus obtains prediction image data by performing motion compensation based on the motion vector. Then, the image coding apparatus obtains a difference between the prediction image data and the image data of the current picture. Next, the image coding apparatus codes the obtained difference. With this, the image coding apparatus eliminates the redundancy in the temporal direction.

In the motion estimation, the image coding apparatus calculates a difference value between a current block to be coded in the current picture and a block in the reference picture, and determines, as a reference block, a block with the smallest difference value in the reference picture. Then, the image coding apparatus detects the motion vector, using the current block and the reference block.

An image coding apparatus according to a standardized image coding system (see Non Patent Literature (NPL) 1) called H.264 uses three picture types of I-picture, P-picture, and B-picture for compressing the amount of information. The image coding apparatus does not perform inter prediction on the I-picture. This means that the image coding apparatus performs intra prediction on the I-picture. The intra prediction is also called intra picture prediction.

In addition, the image coding apparatus performs inter prediction on the P-picture by referring to a coded picture that precedes or follows the current picture in display order. In addition, the image coding apparatus performs inter prediction on the B-picture by referring to two coded pictures that precede or follow the current picture in display order.

The motion vector used in coding is also used in decoding. Accordingly, information of the motion vector used in coding is stored in a bitstream that is output as a coded image. Then, image decoding processing is performed using the information on the motion vector included in the bitstream.

In addition, a structure for predicting a motion vector is employed in the image coding system of H.264 for compressing information of the motion vector. FIG. 39 is a diagram illustrating prediction of a motion vector. FIG. 39 indicates a current block to be coded and three adjacent blocks mbA, mbB, and mbC which are adjacent to the current block. Here, the three adjacent blocks mbA, mbB, and mbC are already coded.

A motion vector vA is a motion vector used in coding of the adjacent block mbA that is adjacent on the left to the current block. In addition, a motion vector vB is a motion vector used in coding of the adjacent block mbB that is adjacent on the upper side of the current block. In addition, a motion vector vC is a motion vector used in coding of the adjacent block mbC that is adjacent on the right to the current block.

It is predicted that the motion vector of the current block is a median value of the three motion vectors vA, vB, and vC. The motion vector obtained by the prediction is called a motion vector predictor and also called a prediction vector. The motion vector predictor illustrated in FIG. 39 is a median value of the three motion vectors vA, vB, and vC, and predicted for the current block.

In addition, a motion vector my illustrated in FIG. 39 is a motion vector derived from the motion estimation and used for coding the current block. The information of the motion vector my is compressed by subtracting the motion vector predictor from the motion vector my. The motion vector obtained by subtracting the motion vector predictor from the motion vector my is called a motion vector difference.

The information of the motion vector included in a bitstream resulting from coding is compressed as described above. Furthermore, in image decoding processing, the compressed motion vector is reconstructed using an equivalent prediction. More specifically, in the image decoding processing, the motion vector is reconstructed by adding together the motion vector difference included in a bitstream and the motion vector predictor resulting from prediction. With this, coding and decoding with high compression efficiency (also called coding efficiency) are implemented.

CITATION LIST

Non Patent Literature

[NPL 1]
ITU-T Recommendation H.264 "Advanced video coding for generic audiovisual services" 2010, March

SUMMARY OF INVENTION

Technical Problem

However, with the conventional prediction methods for a motion vector, the coding efficiency does not improve in some cases. For example, in the conventional prediction methods, a motion vector of an adjacent block is used. Accordingly, prediction of a motion vector turns out to be largely incorrect in a block having a motion different from the adjacent block, and thus the coding efficiency does not improve.

In addition, when the current block is a block located at the upper left of the current picture, the adjacent block is not coded, Thus, the motion vector of the adjacent block cannot be used for the prediction of a motion vector. In this case, prediction of a motion vector is difficult.

As described above, the advantageous effect of the improvement of coding efficiency resulting from the prediction of a motion vector cannot be sufficiently obtained with the conventional prediction methods. In view of the above, an object of the present invention is to provide an image coding method for enabling prediction of a motion vector with high accuracy and coding an image with high coding efficiency, and an image decoding method corresponding to the image coding method.

Solution to Problem

In order to solve the above-described problem, an image coding method according to an aspect of the present disclosure is an image coding method for coding an image on a block-by-block basis, the method including: calculating a disparity motion vector predictor for predicting a motion vector of a current block to be coded, from a motion vector of a disparity block that is a block having a relationship of disparity with the current block and located at a position corresponding to a position of the current block; selecting a motion vector predictor for use in prediction of the motion vector of the current block, from among one or more motion vector predictor candidates including the disparity motion vector predictor; and coding (i) identification information corresponding to the motion vector predictor selected from among the one or more motion vector predictor candidates and (ii) a motion vector difference that is a difference between the motion vector of the current block and the motion vector predictor.

With this, the disparity motion vector predictor for predicting a motion vector with high accuracy is added to the list of the motion vector predictor candidates. Thus, the motion vector is predicted with high accuracy. Therefore, an image is coded with high coding efficiency.

In addition, in the calculating, the disparity motion vector predictor may be calculated from the motion vector of the disparity block included in a field located closest, in display order, to a field that includes the current block.

With this, a motion vector of a temporally close disparity block is used. It is expected that the characteristics of a motion vector of such a disparity block are similar to the characteristics of a motion vector of a current block to be coded. Thus, the prediction accuracy of the motion vector improves.

In addition, in the calculating, the disparity motion vector predictor may be calculated from the motion vector of the disparity block included in a picture that includes the current block.

With this, a motion vector of a disparity block included in the same picture as the current block is used. It is expected that the characteristics of a motion vector of such a disparity block are similar to the characteristics of a motion vector of a current block to be coded. Thus, the prediction accuracy of the motion vector improves.

In addition, the image coding method may further include determining whether or not the disparity motion vector predictor is to be included in the one or more motion vector predictor candidates, and in the selecting, when it is determined, in the determining, that the disparity motion vector predictor is to be included in the one or more motion vector predictor candidates, the motion vector predictor may be selected from among the one or more motion vector predictor candidates including the disparity motion vector predictor.

With this, it is possible to adaptively select whether or not a disparity motion vector predictor is to be added. It is therefore possible to reduce increase in processing amount resulting from the use of the disparity motion vector predictor.

In addition, in the determining, when the motion vector of the disparity block refers to a field having a relationship of same parity with the disparity block, it may be determined that the disparity motion vector predictor is to be included in the one or more motion vector predictor candidates.

With this, a motion vector of a disparity block is used when the motion vector of the disparity block refers to the same field. It is expected that the characteristics of a motion vector of such a disparity block are similar to the characteristics of a motion vector of a current block to be coded. Use of the motion vector of the disparity block is limited only to such a case, thereby allowing both the improvement in prediction accuracy and the reduction of increase in the processing amount.

In addition, in the determining, when the motion vector of the disparity block is smaller than or equal to a threshold, it may be determined that the disparity motion vector predictor is to be included in the one or more motion vector predictor candidates.

With this, a motion vector of a disparity block is used when the motion vector of the disparity block is smaller than or equal to a threshold. It is expected that the characteristics of a motion vector of such a disparity block are similar to the characteristics of a motion vector of a current block to be coded. Use of the motion vector of the disparity block is limited only to such a case, thereby allowing both the improvement in prediction accuracy and the reduction of increase in the processing amount.

In addition, in the coding, when the motion vector of the disparity block refers to a field having a relationship of same parity with the disparity block, a bitstream shorter than a bitstream of the case where the motion vector of the disparity block refers to a field having a relationship of disparity with the disparity block may be allocated to identification information corresponding to the disparity motion vector predictor, to code the identification information corresponding to the motion vector predictor.

With this, the coding efficiency is further improved when a motion vector of a disparity block refers to the same field and is used as a motion vector predictor.

In addition, in the coding, when the motion vector of the disparity block is smaller than or equal to a threshold, a bitstream shorter than a bitstream of the case where the motion vector of the disparity block is larger than the threshold may be allocated to identification information corresponding to the disparity motion vector predictor, to decode the identification information corresponding to the motion vector predictor.

With this, the coding efficiency is further improved when a motion vector of a disparity block is smaller than or equal to a threshold and is used as a motion vector predictor.

In addition, in the selecting, the motion vector predictor may be selected such that a code amount obtained in the coding by coding the identification information corresponding to the motion vector predictor and the motion vector difference becomes smallest.

With this, a more appropriate candidate is selected as a motion vector predictor according to an overall code amount. Therefore, the coding efficiency is improved.

In addition, in the selecting, the motion vector predictor having the smallest error with respect to the motion vector of the current block may be selected from among the one or more motion vector predictor candidates.

With this, a candidate having a smaller error with respect to the motion vector of a current block is selected as a motion vector predictor. Thus, the prediction accuracy of the motion vector improves.

In addition, further in the coding, the number of motion vector predictor candidates, out of the one or more motion vector predictor candidates, which are calculated respectively from motion vectors of blocks included in a field or a picture in which the current block is not included may be coded.

With this, the number of candidates obtained using a different field or a different picture, such as a temporal direct vector, is transmitted to the decoding side, it is therefore possible to properly adjust the balance between improvement of the prediction accuracy and reduction of increase in the processing amount in both coding and decoding.

In addition, in the calculating, the disparity motion vector predictor for predicting the motion vector of the current block may be calculated from the motion vector of the disparity block included in a first view of the image that is a multiview video image, the current block being included in a second view different from the first view.

With this, the disparity motion vector predictor is employed in a multiview video image. Thus, the prediction accuracy of the motion vector improves in the multiview video image.

In addition, an image decoding method according to an aspect of the present invention may be an image decoding method for decoding a coded image on a block-by-block basis, the method including: calculating a disparity motion vector predictor for predicting a motion vector of a current block to be decoded, from a motion vector of a disparity block that is a block having a relationship of disparity with the current block and located at a position corresponding to a position of the current block; decoding (i) identification information corresponding to a motion vector predictor selected in coding from among one or more motion vector predictor candidates including the disparity motion vector predictor and (ii) a motion vector difference that is a difference between the motion vector of the current block and the motion vector predictor; and selecting the motion vector predictor from among the one or more motion vector predictor candidates, using the identification information corresponding to the motion vector predictor.

With this, the disparity motion vector predictor for predicting a motion vector with high accuracy is added to the list of the motion vector predictor candidates. Thus, the motion vector is predicted with high accuracy. It is therefore possible to decode the image that is coded with high coding efficiency.

In addition, in the calculating, the disparity motion vector predictor may be calculated from the motion vector of the disparity block included in a field located closest, in display order, to a field that includes the current block.

With this, a motion vector of a temporally close disparity block is used. It is expected that the characteristics of a motion vector of such a disparity block are similar to the characteristics of a motion vector of a current block to be decoded. Thus, the prediction accuracy of the motion vector improves.

In addition, in the calculating, the disparity motion vector predictor may be calculated from the motion vector of the disparity block included in a picture that includes the current block.

With this, a motion vector of a disparity block included in the same picture as the current block is used. It is expected that the characteristics of a motion vector of such a disparity block are similar to the characteristics of a motion vector of a current block to be decoded. Thus, the prediction accuracy of the motion vector improves.

In addition, the image decoding method may include determining whether or not the disparity motion vector predictor is to be included in the one or more motion vector predictor candidates, wherein in the selecting, when it is determined, in the determining, that the disparity motion vector predictor is to be included in the one or more motion vector predictor candidates, the motion vector predictor may be selected from among the one or more motion vector predictor candidates including the disparity motion vector predictor.

With this, it is possible to adaptively select whether or not a disparity motion vector predictor is to be added. It is therefore possible to reduce increase in processing amount resulting from the use of the disparity motion vector predictor.

In addition, in the determining, when the motion vector of the disparity block refers to a field having a relationship of same parity with the disparity block, it may be determined that the disparity motion vector predictor is to be included in the one or more motion vector predictor candidates.

With this, a motion vector of a disparity block is used when the motion vector of the disparity block refers to the same field. It is expected that the characteristics of a motion vector of such a disparity block are similar to the characteristics of a motion vector of a current block to be decoded. Use of the motion vector of the disparity block is limited only to such a case, thereby allowing both the improvement in prediction accuracy and the reduction of increase in the processing amount.

In addition, in the determining, when the motion vector of the disparity block is smaller than or equal to a threshold, it may be determined that the disparity motion vector predictor is to be included in the one or more motion vector predictor candidates.

With this, a motion vector of a disparity block is used when the motion vector of the disparity block is smaller than or equal to a threshold. It is expected that the characteristics of a motion vector of such a disparity block are similar to the characteristics of a motion vector of a current block to be decoded. Use of the motion vector of the disparity block is limited only to such a case, thereby allowing both the improvement in prediction accuracy and the reduction of increase in the processing amount.

In addition, in the decoding, when the motion vector of the disparity block refers to a field having a relationship of same parity with the disparity block, the identification information corresponding to the disparity motion vector predictor is decoded, based on a rule that a bitstream shorter than a bitstream of the case where the motion vector of the disparity block refers to a field having a relationship of disparity with the disparity block is allocated to identification information corresponding to the disparity motion vector predictor.

With this, a disparity motion vector predictor which is calculated from a motion vector that refers to the same field and which is coded with high coding efficiency as a motion vector predictor is properly decoded. In sum, decoding is properly executed according to the operation of the coding side.

In addition, in the decoding, when the motion vector of the disparity block is smaller than or equal to a threshold, the identification information corresponding to the disparity motion vector predictor is decoded, based on a rule that a bitstream shorter than a bitstream of the case where the motion vector of the disparity block is larger than the threshold is allocated to identification information corresponding to the disparity motion vector predictor.

With this, a disparity motion vector predictor which is calculated from a motion vector that is smaller than a threshold and which is coded with high coding efficiency as a motion vector predictor is properly decoded. In sum, decoding is properly executed according to the operation of the coding side.

In addition, further in the decoding, the number of motion vector predictor candidates, out of the one or more motion vector predictor candidates, which are calculated respectively from motion vectors of blocks included in a field or a picture in which the current block is not included may be decoded.

With this, the number of candidates obtained using a different field or a different picture, such as a temporal direct vector, is obtained from the coding side. It is therefore possible to properly adjust the balance between improvement of the prediction accuracy and reduction of increase in the processing amount in both coding and decoding.

In addition, in the calculating, the disparity motion vector predictor for predicting the motion vector of the current block may be calculated from the motion vector of the disparity block included in a first view of the image that is a multiview video image, the current block being included in a second view different from the first view.

With this, the disparity motion vector predictor is employed in a multiview video image. Thus, the prediction accuracy of the motion vector improves in the multiview video image.

In addition, an image coding apparatus according to an aspect of the present invention is an image coding apparatus for coding an image on a block-by-block basis, the apparatus including: a calculating unit configured to calculate a disparity motion vector predictor for predicting a motion vector of a current block to be coded, from a motion vector of a disparity block that is a block having a relationship of disparity with the current block and located at a position corresponding to a position of the current block; a selecting unit configured to select a motion vector predictor for use in prediction of the motion vector of the current block, from among one or more motion vector predictor candidates including the disparity motion vector predictor; and a coding unit configured to code (i) identification information corresponding to the motion vector predictor selected from among the one or more motion vector predictor candidates and (ii) a motion vector difference that is a difference between the motion vector of the current block and the motion vector predictor.

With this, the image coding method according to the present invention is implemented as an image coding apparatus.

In addition, an image decoding apparatus according to an aspect of the present invention is an image decoding apparatus for decoding a coded image on a block-by-block basis, the apparatus comprising: a calculating unit configured to calculate a disparity motion vector predictor for predicting a motion vector of a current block to be decoded, from a motion vector of a disparity block that is a block having a relationship of disparity with the current block and located at a position corresponding to a position of the current block; a decoding unit configured to decode (i) identification information corresponding to the motion vector predictor selected in coding from among one or more motion vector predictor candidates including the disparity motion vector predictor and (ii) a motion vector difference that is a difference between the motion vector of the current block and the motion vector predictor; and a selecting unit configured to select the motion vector predictor from among the one or more motion vector predictor candidates, using the identification information corresponding to the motion vector predictor.

With this, the image decoding method according to the present invention is implemented as an image decoding apparatus.

In addition, an image coding and decoding apparatus according to the present invention is an image coding and decoding apparatus including an image coding apparatus which codes a first image on a block-by-block basis and an image decoding apparatus which decodes, on a block-by-block basis, a second image that is coded, the image coding apparatus including: a first calculating unit which calculates a first disparity motion vector predictor for predicting a motion vector of a current block to be coded from a motion vector of a first disparity block that is a block having a relationship of disparity with the current block and located at a position corresponding to a position of the current block; a first selecting unit which selects a first motion vector predictor for use in prediction of the motion vector of the current block from among one or more first motion vector predictor candidates including the first disparity motion vector predictor; and a coding unit which codes (i) first identification information corresponding to the first motion vector predictor selected from among the one or more first motion vector predictor candidates and (ii) a first motion vector difference that is a difference between the motion vector of the current block and the first motion vector predictor, the image decoding apparatus including: a second calculating unit which calculates a second disparity motion vector predictor for predicting a motion vector of a current block to be decoded from a motion vector of a second disparity block that is a block having a relationship of disparity with the current block and located at a position corresponding to a position of the current block; a decoding unit which decodes (i) second identification information corresponding to the second motion vector predictor selected, in coding, from among one or more second motion vector predictor candidates including the second disparity motion vector predictor and (ii) a second motion vector difference that is a difference between the motion vector of the current block and the second motion vector predictor; and a second selecting unit which selects the second motion vector predictor from among the one or more second motion vector predictor candidates, using the second identification information corresponding to the second motion vector predictor.

With this, the image coding apparatus and the image decoding apparatus according to the present invention are implemented as an image coding and decoding apparatus.

Advantageous Effects of Invention

According to the present invention, a motion vector is predicted with high accuracy. Therefore, an image is coded with high coding efficiency.

BRIEF DESCRIPTION OF DRAWINGS

FIG. 11 is a diagram which illustrates a list of the motion vector predictor indices according to Embodiment 1.

FIG. 37 shows an example of a look-up table in which video data standards are associated with driving frequencies.

DESCRIPTION OF EMBODIMENTS

An embodiment according to the present invention will be described below with reference to the drawings. It is to be noted that each of the embodiments explained below describes a preferred specific example of the present invention. The numerical values, shapes, materials, structural elements, the arrangement and connection of the structural elements, steps, the processing order of the steps etc. shown in the following embodiments are mere examples, and therefore do not limit the scope of the invention. The present invention is limited only by the scope of the claims. Thus, among the structural elements in the embodiments below, the structural elements which are not described in the independent claims that indicate the broadest concept of the present invention are not necessarily required for solving the problem of the present invention, but are explained as components for a more preferred embodiment.

(Embodiment 1)

Figure 1:
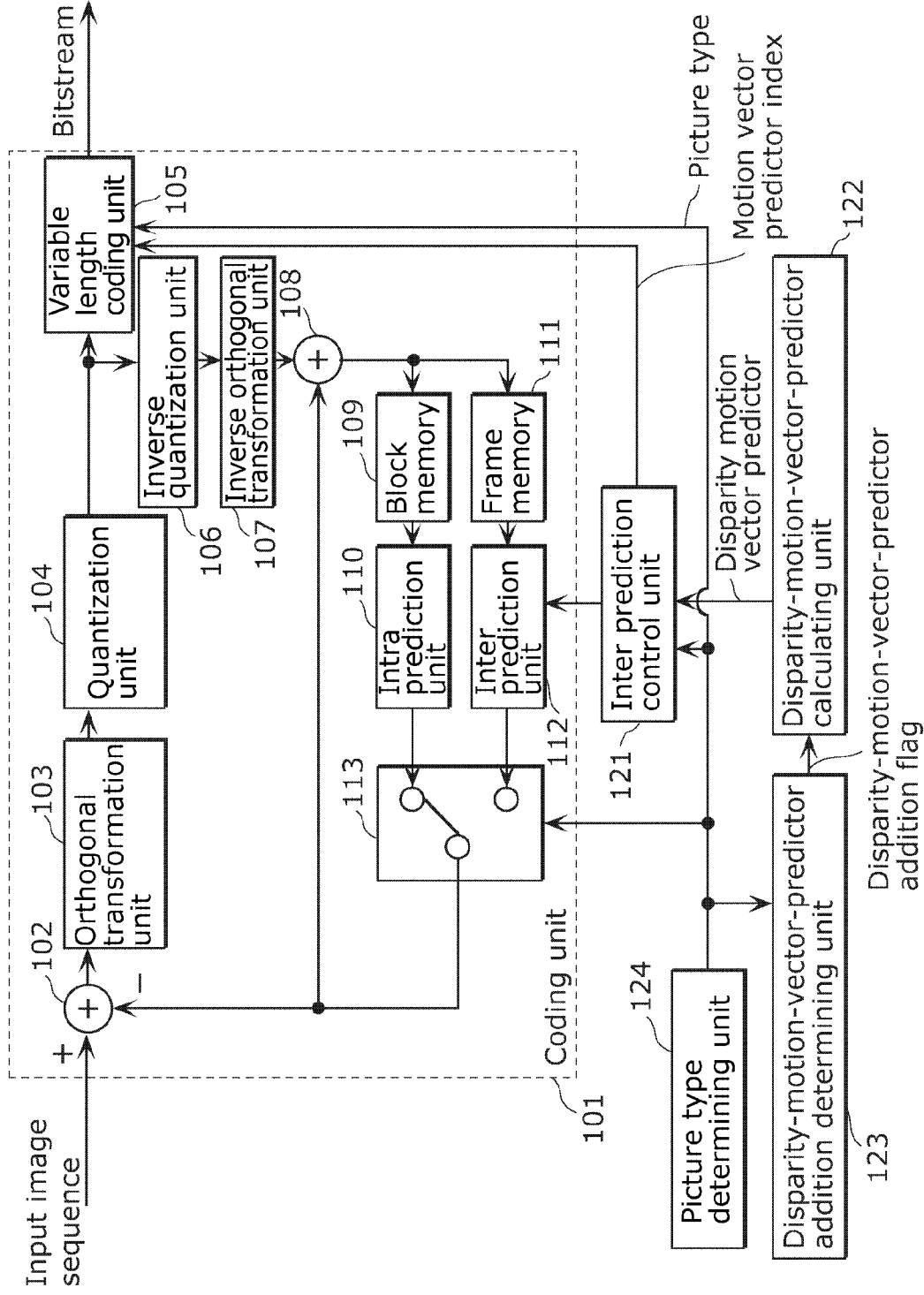
FIG. 1 is a configuration diagram which illustrates an image coding apparatus according to Embodiment 1

FIG. 1 is a configuration diagram which illustrates an image coding apparatus according to Embodiment 1 The image coding apparatus illustrated in FIG. 1 includes: a coding unit 101; an inter prediction control unit 121; a disparity-motion-vector-predictor calculating unit 122; a disparity-motion-vector-predictor addition determining unit 123; and a picture type determining unit 124. In addition, the coding unit 101 includes: a subtractor 102; an orthogonal transformation unit 103; a quantization unit 104; a variable length coding unit 105; an inverse quantization unit 106; an inverse orthogonal transformation unit 107; an adder 108; a block memory 109; an intra prediction unit 110; a frame memory 111; an inter prediction unit 112; and a switch 113.

The subtractor 102 subtracts prediction image data from input image data to output prediction error data. The orthogonal transformation unit 103 performs, on the prediction error data, transformation from an image region (spatial region) to a frequency region. The quantization unit 104 performs quantization processing on the prediction error data which is transformed to the frequency region.

The inverse quantization unit 106 performs inverse quantization on the prediction error data on which quantization is performed by the quantization unit 104. The inverse orthogonal transformation unit 107 performs, on the prediction error data on which inverse quantization is performed, transformation from the frequency region to the image region. The adder 108 adds the prediction error data and the prediction image data together to output reconstructed image data. The block memory 109 is a memory for storing the reconstructed image data per block. The frame memory 111 is a memory for storing the reconstructed image data per frame.

The intra prediction unit 110 codes a current block to be coded by intra prediction using the reconstructed image data per block stored in the block memory 109, to generate prediction image data. The inter prediction unit 112 codes a current block by inter prediction using the reconstructed image data per frame stored in the frame memory 111 and a motion vector derived by motion estimation, to generate prediction image data. The switch 113 switches an encoding mode between intra prediction and inter prediction.

The picture type determining unit 124 determines by which picture type among the types of I picture, B picture, and P picture an input image sequence is coded, and generate picture type information.

The disparity-motion-vector-predictor addition determining unit 123 determines whether or not a disparity motion vector predictor is to be added. The disparity-motion-vector-predictor calculating unit 122 calculates the disparity motion vector predictor. The inter prediction control unit 121 selects a motion vector predictor from among one or more motion vector predictor candidates. Processes performed by the disparity-motion-vector-predictor addition determining unit 123; the disparity-motion-vector-predictor calculating unit 122; and the inter prediction control unit 121 will be described later in detail.

The variable length coding unit 105 performs variable length coding on the prediction error data on which quantization is performed, a motion vector predictor index, the prediction error information (motion vector difference) of the motion vector predictor candidate, picture type information, and the like. With this, the variable length coding unit 105 generates a bitstream.

Figure 2:
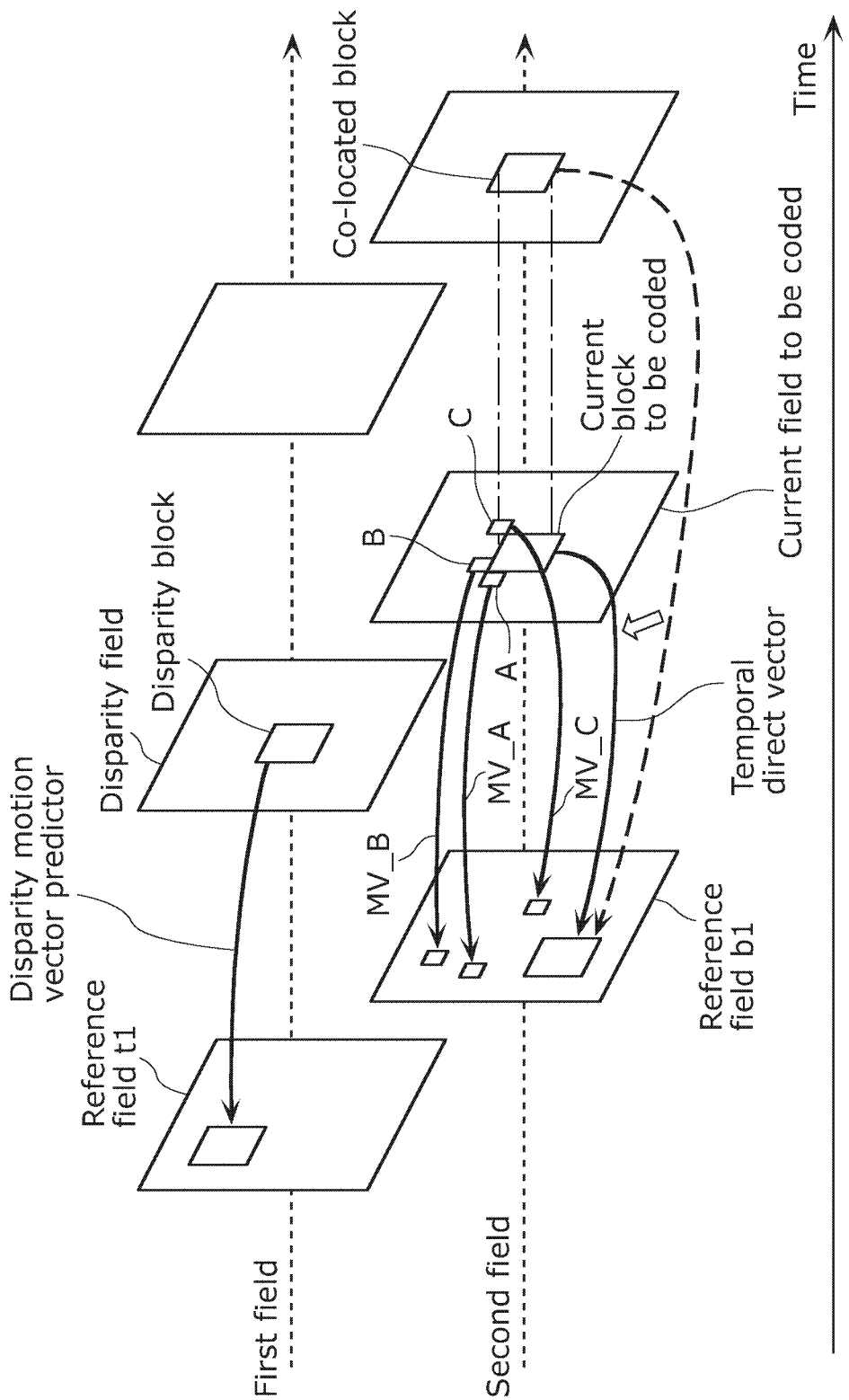
FIG. 2 is an overall conceptual diagram which illustrates a motion vector predictor candidate according to Embodiment 1.

FIG. 2 is an overall conceptual diagram which illustrates a motion vector predictor candidate according to Embodiment 1, Video includes a plurality of pictures. In addition, each of the pictures includes two fields in some cases. FIG. 2 illustrates two fields as a the first field and a second field. In the same picture, the first field is coded first, and the second field is coded next. In general, the first field is a top field and the second field is a bottom field, however, it is not limited to this.

The first field and the second field are expressions which also indicate attributions of the respective fields. A plurality of fields are included in the first field or the second field. A reference field b1 and a current field illustrated in FIG. 2 belong to the second field. When belonging to the same field, the relationship is called the same parity. When belonging to different fields, the relationship is called disparity. The relationship of the reference field b1 and the reference field t1 illustrated in FIG. 2 is the disparity.

Adjacent blocks A, B, and C are illustrated around a current block to be coded included in a current field to be coded. The adjacent block A is a block adjacent on the left of the current block. The adjacent block B is a block adjacent on the upper side of the current block. The adjacent block C is a block adjacent on the upper right of the current block.

Coding on the adjacent blocks A, B, and C is already complete. A motion vector MV_A is a motion vector used for motion compensation performed on the adjacent block A. In the following description, the motion vector which is detected by motion estimation of a block and used for motion compensation on the block is simply referred to as a motion vector of the block. The motion vector MV_B is a motion vector of the adjacent block B. The motion vector MV_C is a motion vector of the adjacent block C.

A median value of each of the three motion vectors MV_A, MV_B, and MV_C is used as a candidate for the motion vector predictor of a current block to be coded (hereinafter also referred to as a motion vector predictor candidate). In addition, each of the three motion vectors MV_A, MV_B, and MV_C may be used as the motion vector predictor candidate.

Furthermore, the motion vector predictor candidate may be calculated from the motion vector of a co-located block. Typically, the co-located block belongs to a field which follows the current field to be coded in the display order and has a relationship of the same parity with the current field. In addition, the co-located block is a block which is present at a position equivalent to a position of the current block in a picture (field).

It is to be noted that the co-located block does not always belong to the field that follows the current field in display order. In other words, the co-located block may belong to the field that precedes the current field in display order. For example, whether the field to which the co-located block belongs follows or precedes the current field to be coded may be switched by a flag stored in a picture header.

When the motion vector of the above-described co-located block is a motion vector indicating the reference field b1, a motion vector whose magnitude is adjusted based on a temporal distance without changing the direction may be used as the motion vector predictor candidate. A motion vector adjusted as described above is called a temporal direct vector. It is to be noted that when the motion vector indicates the reference field b1, it is expressed in some cases as that the motion vector refers to the reference field b1.

In addition, a motion vector predictor candidate may be calculated from the motion vector of a disparity block. The disparity block belongs to a field having the relationship of disparity with the current field to be coded. In addition, the disparity block is a block which is present at a position substantially equivalent to a position of the current block in a picture (field).

Furthermore, the current block and the disparity block are typically included in the same picture. However, the disparity block may be included in a picture different from the picture including the current block to be coded.

The motion vector of the disparity block may be used as the motion vector predictor candidate after the magnitude is adjusted based on a temporal distance without changing the direction. A motion vector predictor based on the motion vector of the disparity block is called a disparity motion vector predictor.

The motion vector of the disparity block which is present at substantially the same position spatially as the current block and temporally close to the current block is close to the motion vector of the current block in many cases. The coding efficiency is increased by using the motion vector of the disparity block for prediction of the motion vector of the current block.

Figure 3:
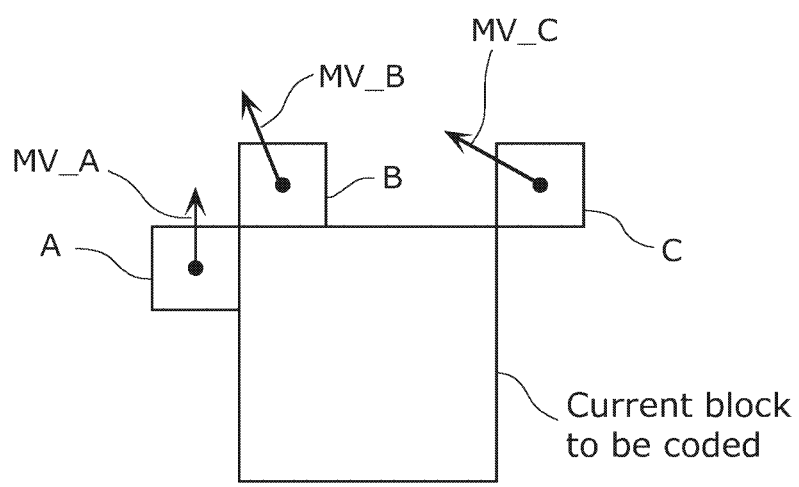
FIG. 3 is a diagram which illustrates a specific example of the motion vector predictor candidate according to Embodiment 1.

FIG. 3 is a diagram which illustrates a specific example of the motion vector predictor candidate according to Embodiment 1. The adjacent blocks A, B, and C are present around the current block to be coded. Three motion vectors MV_A, MV_B, and MV_C corresponding to the three adjacent blocks A, B, and C, respectively, or their respective median values are used as the motion vector predictor candidates.

Here, the current block and the three adjacent blocks A, B, and C may have sizes different from each other. In addition, the current block may be divided into sub-blocks and the motion vector predictor candidate may be determined per sub-block.

As described above, the inter prediction control unit 121 illustrated in FIG. 1 obtains the motion vector predictor candidate from a plurality of adjacent blocks.

Figure 4:
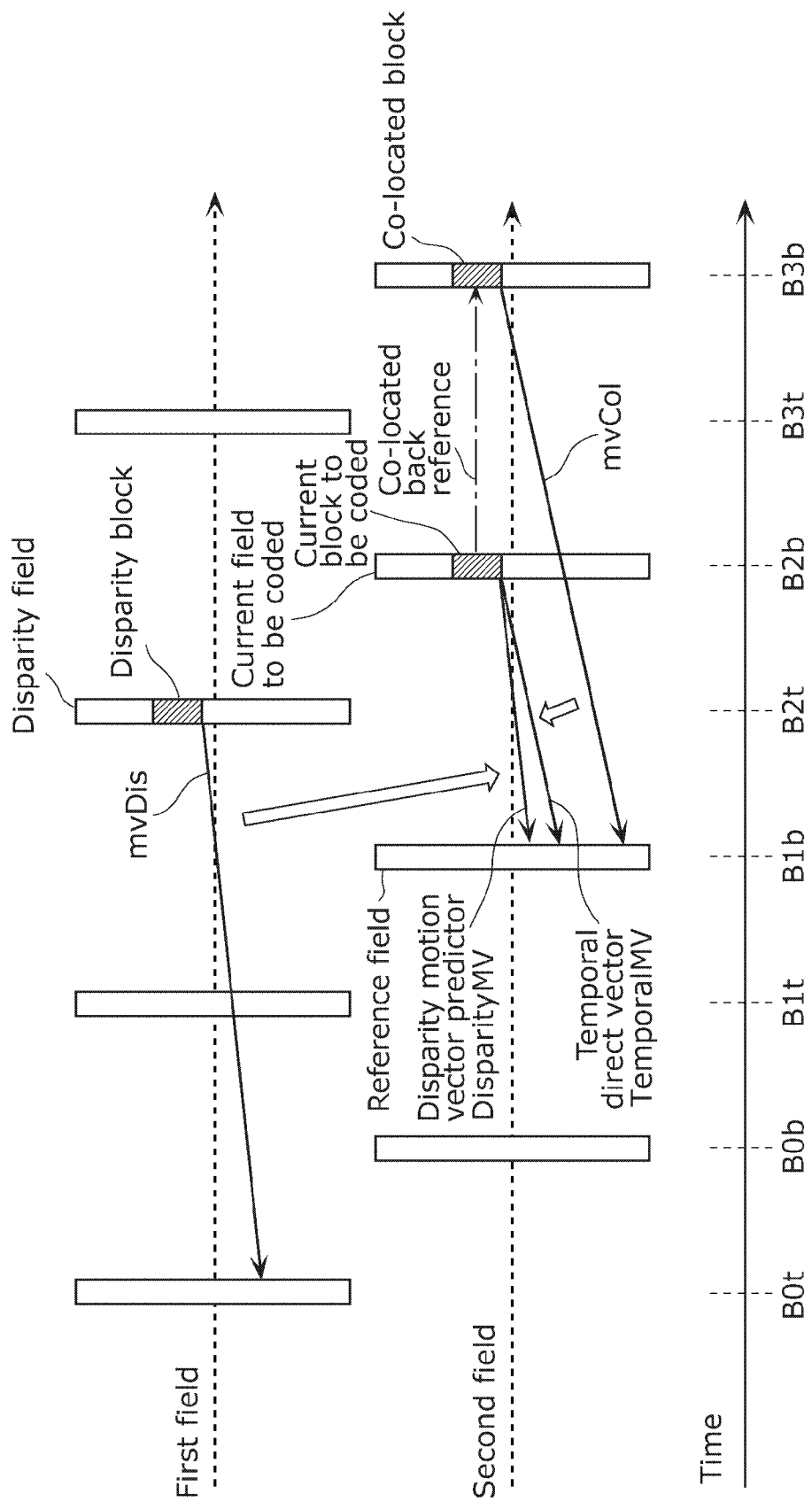
FIG. 4 is a diagram which illustrates a temporal direct vector and a disparity motion vector predictor according to Embodiment 1.

FIG. 4 is a diagram which illustrates a temporal direct vector and a disparity motion vector predictor according to Embodiment 1. At times B0t, B1t, B2t, and B3t, a plurality of fields which belong to the first field are displayed in sequence. In addition, at times B0b, B1b, B2b, and B3b, a plurality of fields which belong to the second field are displayed in sequence. With this, the field that belongs to the first field and the field that belongs to the second field are alternately displayed.

The first field at the time B0t and the second field at the time B0b constitute a single picture. The first field at the time B1t and the second field at the time B1b constitute a single picture. In the same manner as above, the first field at the time B2t and the second field at the time B2b constitute a single picture, and the first field at the time B3t and the second field at the time B3b constitute a single picture.

It is to be noted that coding and decoding according to Embodiment 1 are typically applied to such video called an interlaced image. However, the coding and the decoding according to Embodiment 1 may be applied to video in which frame coding and field coding are switched per picture or may be applied to video in which frame coding and field coding are switched per block.

The co-located block is referred to by the current block through co-located back reference. A motion vector mvCol of the co-located block indicates a field at the time B1b from a field at the time B3b. The current block is present in a field at the time B2b. In such a case, the temporal direct vector TemporalMV that indicates the field at the time B1b from the current block is calculated by Expression 1.

TemporalMV=mvCol×(B2b−B1b)/(B3b−B1b)  (Expression 1)

The direction of the temporal direct vector TemporalMV is the same as the direction of the motion vector mvCol of the co-located block. The ratio of the magnitude of the temporal direct vector TemporalMV to the magnitude of the motion vector mvCol of the co-located block is equal to the ratio of temporal distances from each of the blocks to the reference field. As described above, the temporal direct vector TemporalMV is calculated.

The disparity block is included in a disparity field having a relationship of disparity with the current field to be coded. A motion vector mvDis of the disparity block indicates a field at the time B0t from a field at the time B2t. In such a case, the disparity motion vector predictor DisparityMV that indicates the field at the time B1b from the current block is calculated by Expression 2.

DisparityMV=mvDis×(B2b−B1b)/(B2t−B0t)  (Expression 2)

The direction of the disparity motion vector predictor DisparityMV is the same as the direction of the motion vector mvDis of the disparity block. The ratio of the magnitude of the disparity motion vector predictor DisparityMV to the magnitude of the motion vector mvDis of the disparity block is equal to the ratio of temporal distances from the blocks to the reference fields.

The disparity-motion-vector-predictor calculating unit 122 illustrated in FIG. 1 calculates such disparity motion vector predictor DisparityMV. The inter prediction control unit 121 obtains the disparity motion vector predictor DisparityMV and the temporal direct vector TemporalMV as the motion vector predictor candidates. The temporal direct vector TemporalMV may be calculated by any one of the processing units illustrated in FIG. 1, or may be calculated by a temporal direct vector calculating unit which is not illustrated.

Furthermore, FIG. 4 illustrates an example of the case where the current block and the disparity block belong to the same picture, However, when the image changes significantly between the time B2t and the time B2b, the disparity-motion-vector-predictor calculating unit 122 may use the motion vector of the disparity block at the time B3t.

In addition, when the current block is present in the first field that is coded first in a single picture, the disparity-motion-vector-predictor calculating unit 122 may use a motion vector of the disparity block included in a different picture. For example, when the current block is included in the first field at the time B2t, the disparity-motion-vector-predictor calculating unit 122 may use a motion vector of the disparity block included in the second field at the time B1b.

It is preferable that the disparity-motion-vector-predictor calculating unit 122 uses a motion vector of the disparity block included in a field that is closest to the current field in display order. This is because the closest field in display order is also similar in information on motion. The disparity-motion-vector-predictor calculating unit 122 may determine the field to which a disparity block to be used belongs, using motion information of a coded image.

The disparity-motion-vector-predictor calculating unit 122 may determine the field to which a disparity block to be used belongs, based on which one of the first field and the second field the current block belongs. In addition, the disparity-motion-vector-predictor calculating unit 122 may determine the field to which a disparity block to be used belongs, based on to which one of I-picture, P-picture, and B picture the picture type is, and the like.

In addition, the disparity-motion-vector-predictor calculating unit 122 may use a motion vector of the disparity block as a motion vector of the co-located block, by reordering a plurality of fields.

For example, the disparity-motion-vector-predictor calculating unit 122 replaces the field at the time B2t with the field at the time B3b using a reordering command of a plurality of fields. This allows the disparity-motion-vector-predictor calculating unit 122 to use a motion vector of the disparity block as a motion vector of the co-located block.

Figures 5, 6:
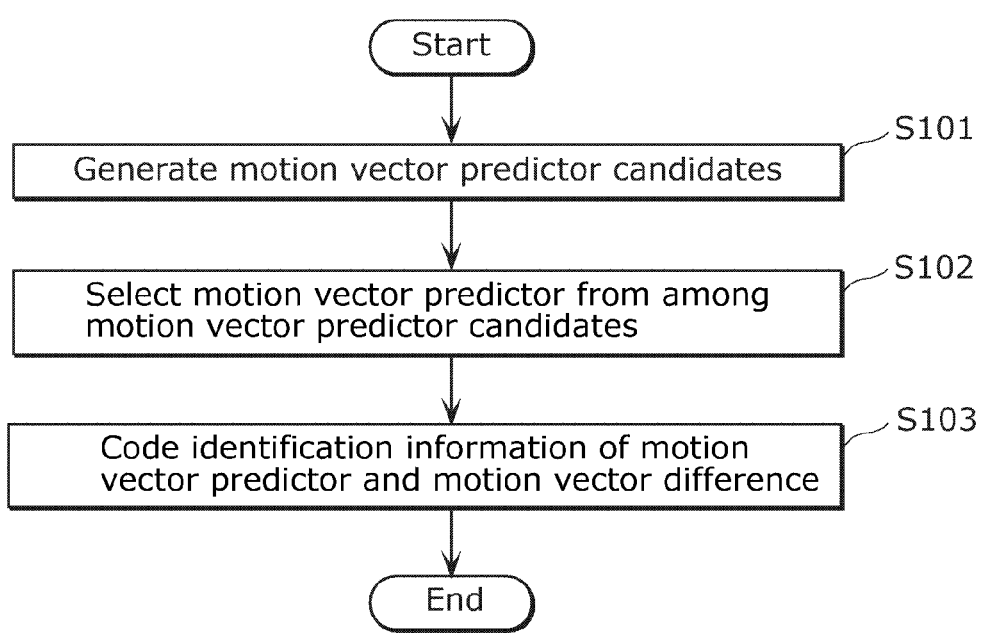
FIG. 5 is a diagram which illustrates a list of the motion vector predictor candidates according to Embodiment 1.
FIG. 6 is a flowchart which illustrates processes performed by the image coding apparatus according to Embodiment 1.

FIG. 5 is a diagram which illustrates a list of the motion vector predictor candidates according to Embodiment 1. The prediction motion vector indices are each an index for identifying a prediction motion vector candidate. The prediction motion vector indices are each also identification information for identifying a prediction motion vector candidate. It is to be noted that the list illustrated in FIG. 5 is an example, and thus the list may lack part of it or may include another motion vector predictor candidate. In addition, the motion vector predictor indices may also be allocated with different values.

The motion vector predictor candidate corresponding to the motion vector predictor index 0 is based on a median value of the motion vectors MV_A, MV_B, and MV_C which are motion vectors of the three adjacent blocks A, B, and C, respectively. The median value is constituted by a combination of a median value of a vertical direction component and a median value of a horizontal direction component of the three motion vectors MV_A, MV_B, and MV_C.

The motion vector predictor candidate corresponding to the motion vector predictor index 1 is the motion vector MV_A of the adjacent block A. The motion vector predictor candidate corresponding to the motion vector predictor index 2 is the motion vector MV_B of the adjacent block B. The motion vector predictor candidate corresponding to the motion vector predictor index 3 is the motion vector MV_C of the adjacent block C.

The motion vector predictor candidate corresponding to the motion on vector predictor index 4 is the temporal direct vector. The motion vector predictor candidate corresponding to the motion vector predictor index 5 is the disparity motion vector predictor.

The motion vector predictor candidates are obtained from a coded adjacent block, a coded co-located block, and a motion vector of a coded disparity block. The motion vector of each of the blocks is a motion vector detected by motion estimation and used for motion compensation. However, the motion vector of each of the blocks may be determined by a different method.

The inter prediction control unit 121 illustrated in FIG. 1 generates the list of the motion vector predictor candidates illustrated in FIG. 5 together with the motion vector predictor indices, Then the inter prediction control unit 121 selects, as a motion vector predictor, a motion vector predictor candidate from among one or more motion vector predictor candidates.

The variable length coding unit 105 codes a motion vector difference that is a difference between the selected motion vector predictor candidate and the motion vector of the current block. In addition, the variable length coding unit 105 codes a motion vector predictor index corresponding to the selected motion vector predictor candidate.

FIG. 6 is a flowchart which illustrates processes of the image coding apparatus according to Embodiment 1 illustrated in FIG. 1. The flowchart illustrated in FIG. 6 corresponds to the processes for a single block. It is to be noted that the block is typically a macroblock, but a different block obtained by dividing a picture may be used.

First, the inter prediction control unit 121 generates a list of motion vector predictor candidates (S101). At this time, the disparity-motion-vector-predictor calculating unit 122 calculates a disparity motion vector predictor. Then, the inter prediction control unit 121 obtains the calculated disparity motion vector predictor and adds to the list of motion vector predictor candidates.

Next, the inter prediction control unit 121 selects a motion vector predictor from among one or more motion vector predictor candidates (S102). The motion vector predictor is a vector that is used for prediction when coding a motion vector used in motion compensation of the current block to be coded.

Next, the variable length coding unit 105 codes identification information corresponding to the motion vector predictor. The identification information is identification information for identifying a motion vector predictor from among the one or more motion vector predictor candidates. In addition, the variable length coding unit 105 codes a motion vector difference that is a difference between the motion vector of the current block and the selected motion vector predictor (S103). The motion vector difference may be calculated by the inter prediction unit 112 or may by calculated by the inter prediction control unit 121. Alternatively, any other processing unit may perform the calculation.

In this way, prediction is used for coding of the motion vector. The same prediction is used in the image decoding apparatus. Accordingly, the motion vector that is coded using prediction is properly decoded. Thus, the coding efficiency of the motion vector is improved and the coding efficiency of the video is improved.

Figure 7:
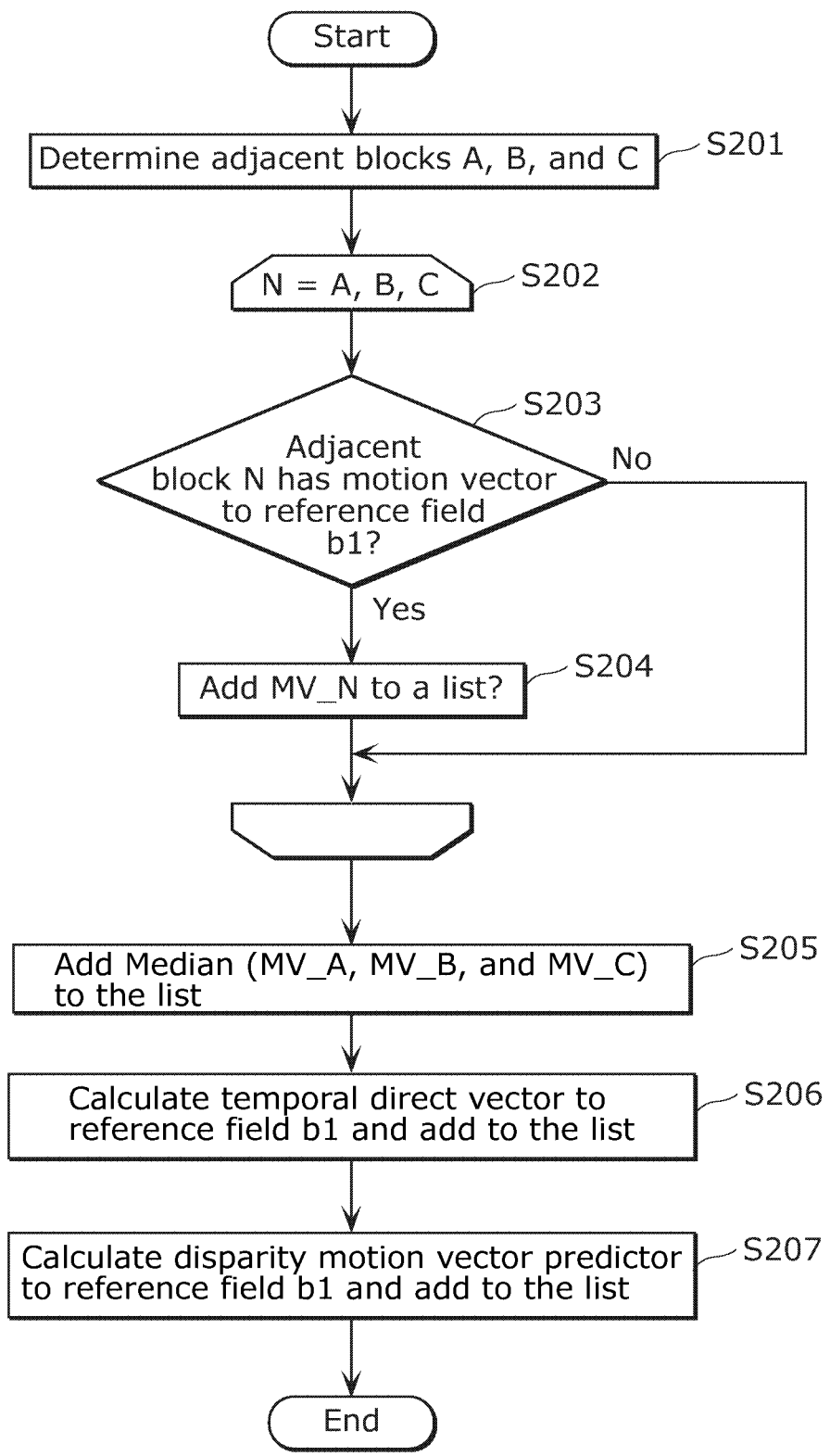
FIG. 7 is a flowchart which illustrates processes for generating a motion vector predictor according to Embodiment 1.

FIG. 7 is a flowchart which illustrates details of the process of generating the motion vector predictor candidate according to Embodiment 1 illustrated in FIG. 6. In the flowchart illustrated in FIG. 7, processes in the state illustrated in the overall conceptual diagram of FIG. 2 are assumed.

First, the inter prediction control unit 121 determines the adjacent blocks A, B, and C (S201). The adjacent blocks A, B, and C are blocks adjacent on the left, on the upper side, and on the upper right, of the current block, respectively.

Next, the inter prediction control unit 121 executes the following process for the adjacent blocks N (N=A, B, C) (S202). Specifically, the inter prediction control unit 121 determines whether or not the adjacent block N has a motion vector to the reference field b1 (S203). In other words, the inter prediction control unit 121 determines whether or not the motion vector of the adjacent block N indicates the reference field b1.

Here, when the adjacent block N has the motion vector to the reference field b1 (Yes in S203), the inter prediction control unit 121 adds a motion vector MV_N to the list (S204). For example, the inter prediction control unit 121 adds the motion vector MV_A to the list of the motion vector predictor candidates. On the other hand, when the adjacent block N does not have the motion vector to the reference field b1 (No in S203), the inter prediction control unit 121 does not add the motion vector MV_N to the list.

The inter prediction control unit 121 executes the above-described processes for the adjacent blocks N (N=A, B, C). With this, the number of the motion vector predictor candidates included in the list of the motion vector predictor candidates changes. A list of the motion vector predictor candidates is also generated on the decoding side in the same manner as above, and thus the motion vector predictor candidates match between the coding side and the decoding side. It is possible to flexibly set the motion vector predictor candidates by making the processes on the decoding side match the processes on the coding side.

In addition, the inter prediction control unit 121 is capable of reducing the numerical value of a motion vector predictor index by reducing the number of the motion vector predictor candidates. Furthermore, when a plurality of motion vector predictor candidates indicate the same vector, the inter prediction control unit 121 may store, as a single motion vector predictor candidate, the plurality of motion vector predictor candidates into the list of the motion vector predictor candidates. With this, the inter prediction control unit 121 can further reduce the number of the motion vector predictor candidates, thereby enabling reducing the numerical value of a motion vector predictor index.

The inter prediction control unit 121 can reduce a code amount for coding the motion vector predictor index, by reducing the numerical value of the motion vector predictor index. The processing of reducing the numerical value of the motion vector predictor index can also be implemented in both the coding side and the decoding side by applying the same rule.

Next, the inter prediction control unit 121 adds a median value of the three motion vectors MV_A, MV_B, and MV_C to the list of the motion vector predictor candidates (S205). Next, the inter prediction control unit 121 calculates a temporal direct vector to the reference field b1. Then, the inter prediction control unit 121 adds the calculated temporal direct vector to the list of the motion vector predictor candidates (S206).

Next, the disparity-motion-vector-predictor calculating unit 122 calculates the disparity motion vector predictor to the reference field b1. Then, the inter prediction control unit 121 adds the calculated disparity motion vector predictor to the list of the motion vector predictor candidates (S207).

in the manner as described above, the list of the motion vector predictor candidates is generated. The disparity-motion-vector-predictor addition determining unit 123 illustrated in FIG. 1 may determine whether or not the disparity motion vector predictor is to be added.

Figure 8:
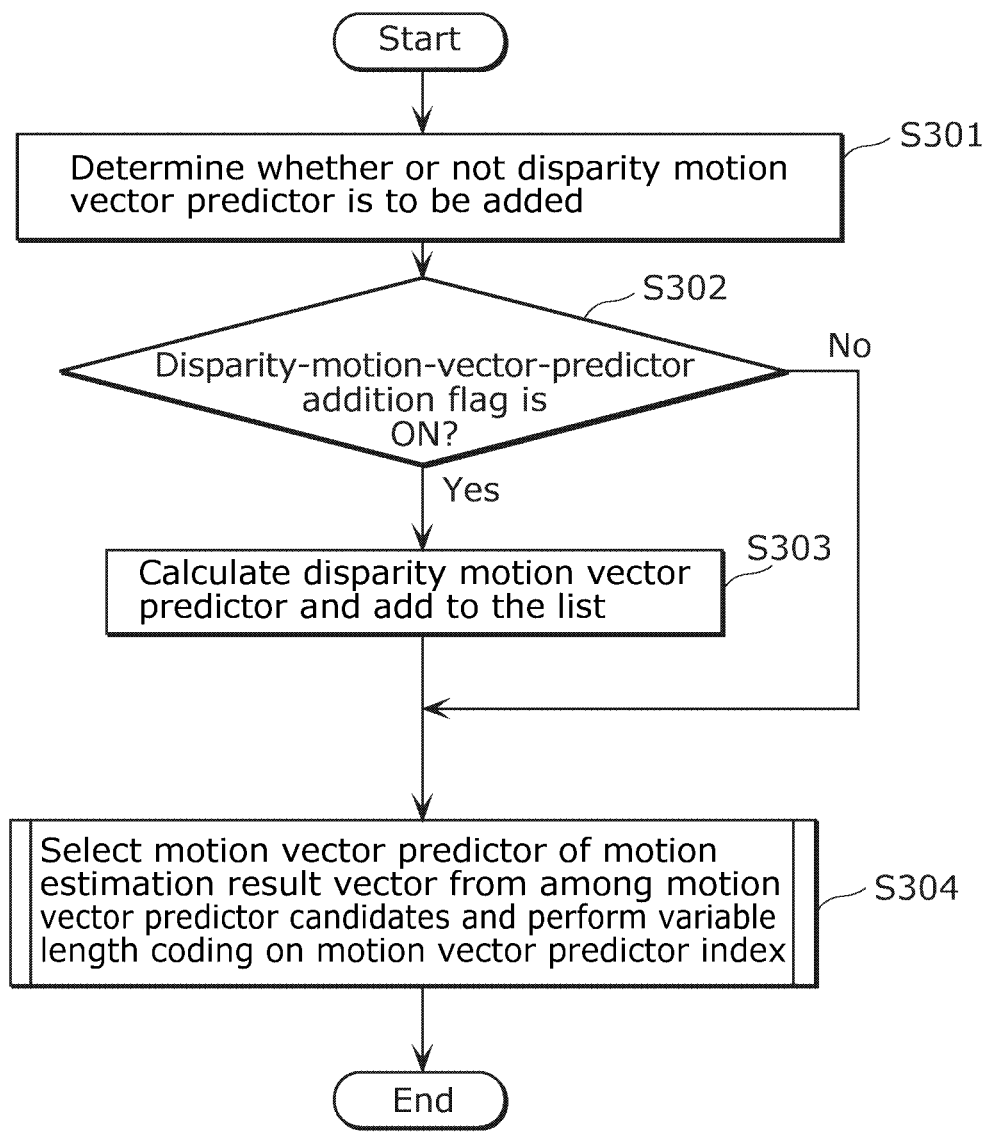
FIG. 8 is a flowchart which illustrates processes for adding a disparity motion vector predictor to the motion vector predictor candidates according to Embodiment 1.

FIG. 8 is a flowchart which illustrates processing of adding a disparity motion vector predictor to the motion vector predictor candidates according to Embodiment 1. The flowchart illustrated in FIG. 8 corresponds to the process of calculating and adding the disparity motion vector predictor illustrated in FIG. 7 (S207), and subsequent processes.

First, the disparity-motion-vector-predictor addition determining unit 123 determines whether or not a disparity motion vector predictor is to be added (S301). Then the disparity-motion-vector-predictor addition determining unit 123 sets a disparity-motion-vector-predictor addition flag. This process will be described later in detail.

Next, when the disparity-motion-vector-predictor addition flag is ON (Yes in S302), the disparity-motion-vector-predictor calculating unit 122 calculates the disparity motion vector predictor. Then, the inter prediction control unit 121 adds the calculated disparity motion vector predictor to the list of the motion vector predictor candidates (S303). When the disparity-motion-vector-predictor addition flag is not ON (No in S302), the disparity-motion-vector-predictor calculating unit 122 does not calculate the disparity motion vector predictor.

Next, the inter prediction control unit 121 selects a motion vector predictor used for prediction of a motion vector of the current block, from among the motion vector predictor candidates. The motion vector predictor of the current block is a motion vector obtained from a result of motion estimation and the like. Then, the variable length coding unit 105 performs variable length coding on a motion vector predictor index corresponding to the selected motion vector predictor (S304). This process will be described later in detail.

With the above-described process, whether or not to use the disparity motion vector predictor is adaptively switched. Thus, it is possible to implement further efficient coding.

Figure 9:
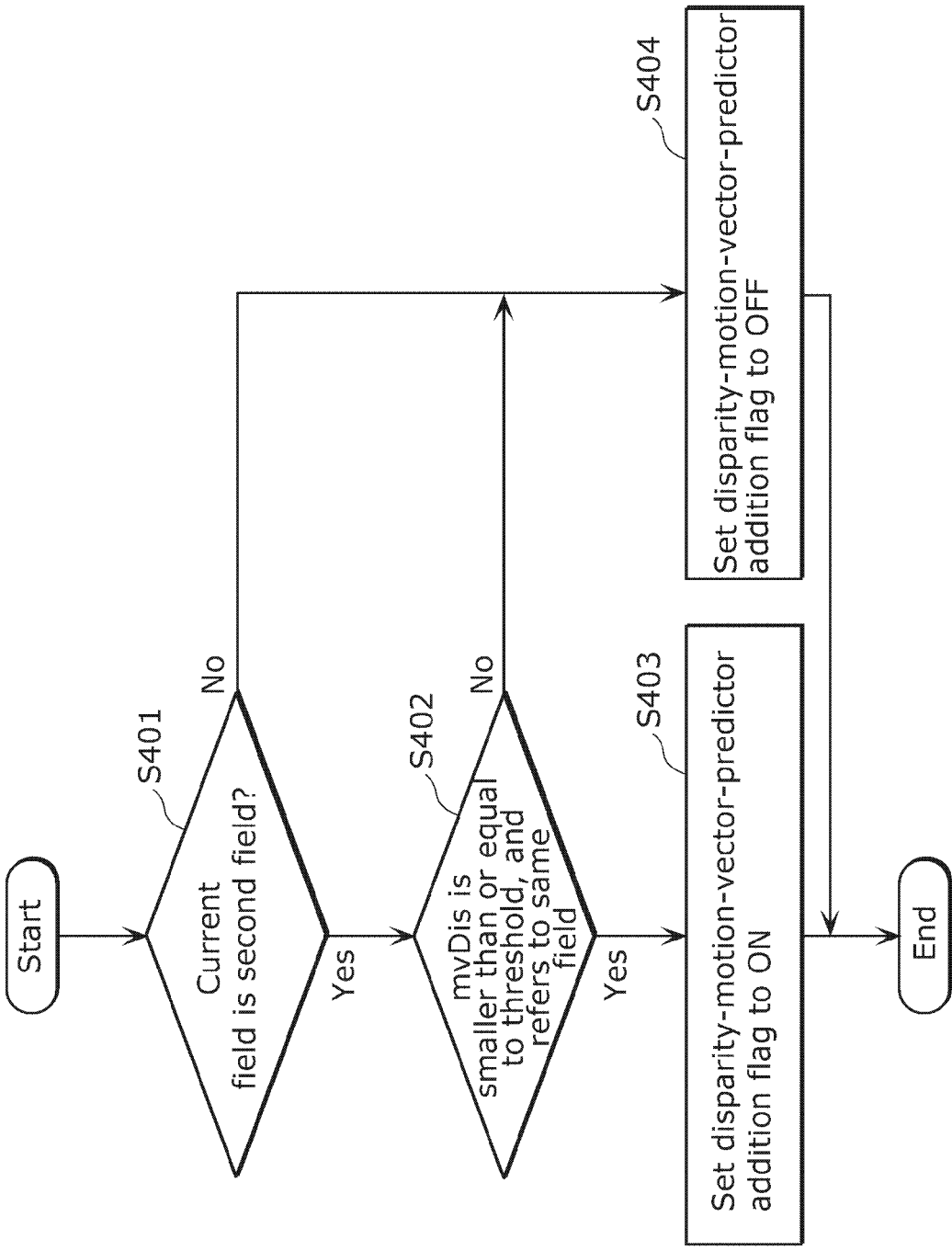
FIG. 9 is a flowchart which illustrates processes for determining whether or not to add the disparity motion vector predictor to the motion vector predictor candidates according to Embodiment 1.

FIG. 9 is a flowchart which illustrates processing of determining whether or not to add the disparity motion vector predictor to the motion vector predictor candidates according to Embodiment 1. This processing corresponds to the disparity-motion-vector-predictor addition determination (S301) illustrated in FIG. 8.

First, the disparity-motion-vector-predictor addition determining unit 123 determines whether or not the current field is the second field (S401). The second field is a field that is coded later among the two fields included in the same picture. When the current field is not the second field (No in S401), the disparity-motion-vector-predictor addition determining unit 123 sets the disparity-motion-vector-predictor addition flag to OFF (S404).

With this, the disparity motion vector predictor is available as the motion vector predictor only when the current field is the second field. In this example, it is assumed that the current block and the disparity block are included in the same picture. This is because that it is relatively easy to obtain a motion vector in the same picture.

Next, the disparity-motion-vector-predictor addition determining unit 123 determines whether or not the magnitude of the motion vector mvDis of the disparity block is smaller than or equal to a threshold, and the motion vector mvDis of the disparity block indicates the same field (S402).

When these conditions are satisfied (Yes in S402), the disparity-motion-vector-predictor addition determining unit 123 sets the disparity-motion-vector-predictor addition flag to ON (S403). When these conditions are not satisfied (No in S402), the disparity-motion-vector-predictor addition determining unit 123 sets the disparity-motion-vector-predictor addition flag to OFF (S404).

When a motion is small, it is highly likely that the motion vector of the disparity block can be used as it is. Accordingly, the disparity-motion-vector-predictor addition determining unit 123 makes the disparity motion vector predictor valid only in such a case, thereby making it possible to improve the processing efficiency.

In the way as described above, the disparity-motion-vector-predictor addition determining unit 123 determines whether or not to add the disparity motion vector predictor to the list of the motion vector predictor candidates. It is to be noted that the flowchart illustrated in FIG. 9 is an example, and thus a different addition determination may be incorporated. For example, since the inter prediction is not employed when the picture type is the I-picture, the disparity-motion-vector-predictor addition determining unit 123 may set the disparity-motion-vector-predictor addition flag to OFF.

Figure 10:
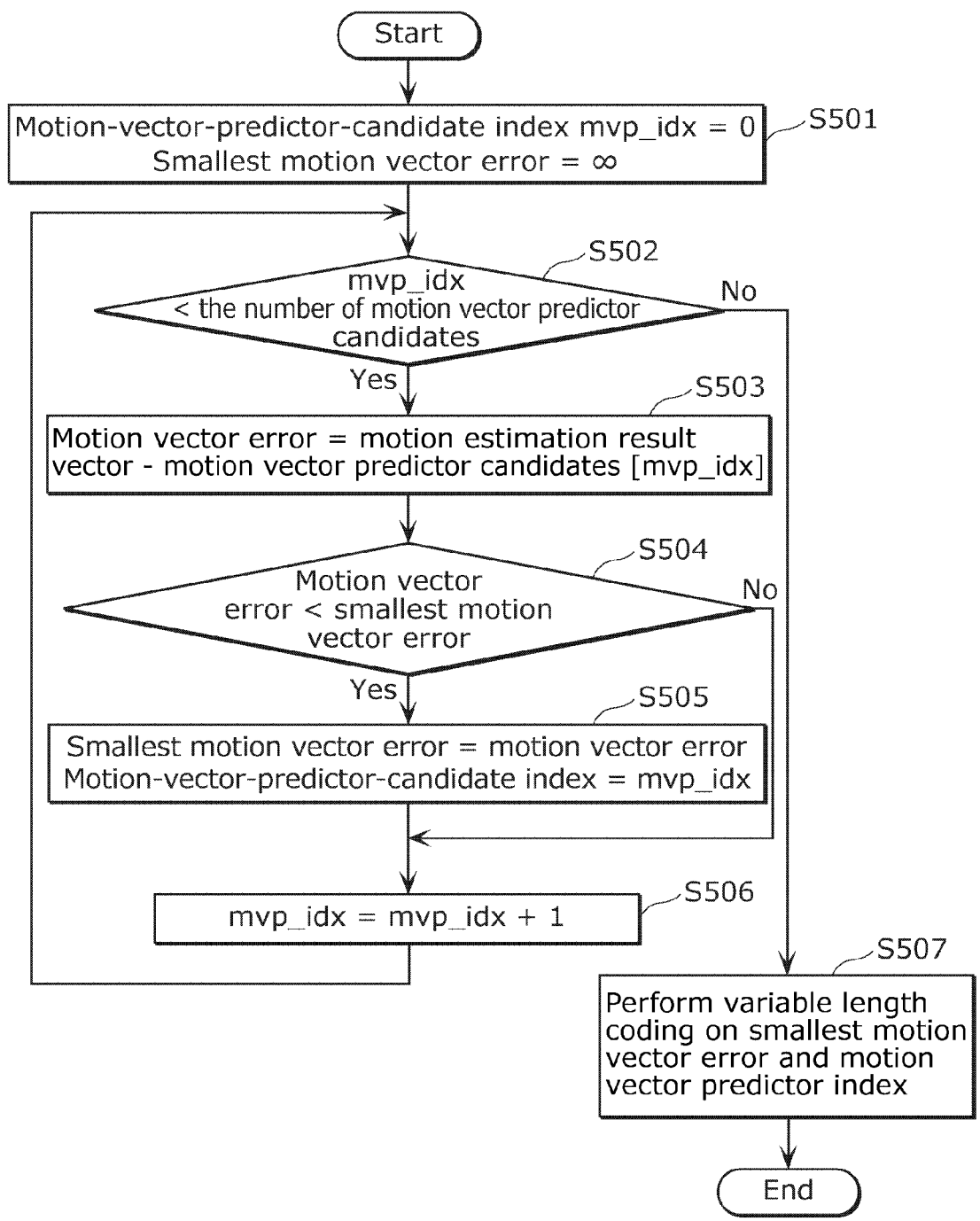
FIG. 10 is a flowchart which illustrates processes for selecting a motion vector predictor from among the motion vector predictor candidates according to Embodiment 1.

FIG. 10 is a flowchart which illustrates processes of selecting a motion vector predictor from among the motion vector predictor candidates according to Embodiment 1.

First, the inter prediction control unit 121 assigns 0 to the motion-vector-predictor-candidate index mvp_idx. In addition, ∞ is assigned to a smallest motion vector error (S501). Here, each of the motion-vector-predictor-candidate index mvp_idx and the smallest motion vector error is a variable.

Next, when the motion-vector-predictor-candidate index mvp_idx is smaller than the number of the motion vector predictor candidates (Yes in S502), the inter prediction control unit 121 calculates an error between the motion estimation result vector and the motion vector predictor candidate. Here, the motion estimation result vector is a motion vector of the current block, and corresponds to the motion vector derived in the motion estimation.

More specifically, the inter prediction control unit 121 subtracts, at this time, the motion vector predictor candidate identified by the motion-vector-predictor-candidate index mvp_idx from the motion vector of the current block. Then, the inter prediction control unit 121 assigns the result of the subtraction to a motion vector error (S503).

Next, when the motion vector error is smaller than the smallest motion vector error (Yes in S504), the inter prediction control unit 121 assigns the motion vector error to the smallest motion vector error. Furthermore, the inter prediction control unit 121 assigns the motion-vector-predictor-candidate index mvp_idx to the motion vector predictor index (S505). Here, each of the smallest motion vector error and the motion vector predictor index is a variable.

When the motion vector error is larger than or equal to the smallest motion vector error (No in S504), the inter prediction control unit 121 does not change the smallest motion vector error and the motion vector predictor index.

Subsequently, the inter prediction control unit 121 adds 1 to the motion-vector-predictor-candidate index mvp_idx (S506). Then, the inter prediction control unit 121 again determines whether or not the motion-vector-predictor-candidate index mvp_idx is smaller than the number of the motion vector predictor candidates (S502).

When the motion-vector-predictor-candidate index mvp_idx is larger than or equal to the number of the motion vector predictor candidates (No in S502), a motion vector predictor which is identified at the time by the motion vector predictor index is the motion vector predictor selected by the inter prediction control unit 121. In addition, the smallest motion vector error at the time is the motion vector difference. The variable length coding unit 105 codes the motion vector predictor index and the smallest motion vector error at the time through variable length coding (S507).

In the manner as described above, the inter prediction control unit 121 selects, as a motion vector predictor, a motion vector predictor candidate having the smallest error value from among the one or more motion vector predictor candidates. It is to be noted that, although the motion vector predictor is selected based on the error value in FIG. 10, the motion vector predictor may be selected based on a code amount.

FIG. 11 is a diagram which illustrates a list of the motion vector predictor indices according to Embodiment 1. An allocation bit string that is allocated at the time of coding is specified for each of the motion vector predictor indices.

In the example illustrated in FIG. 11, 0 is allocated to the motion vector predictor index 0. In addition, 10 is allocated to the motion vector predictor index 1. Furthermore, 110 is allocated to the motion vector predictor index 2. In addition, 1110 is allocated to the motion vector predictor index 3. In addition, 11110 is allocated to the motion vector predictor index 4. Furthermore, 111110 is allocated to the motion vector predictor index 5.

As described above, the larger the motion vector predictor index is, the longer a bit string is allocated. The list of the motion vector predictor indices may be changed based on the same rule as that of decoding. A short bit string is allocated to a motion vector predictor candidate that is preferentially selected, thereby reducing the overall code amount.

For example, when the disparity-motion-vector-predictor addition flag is set to ON in the determination processing illustrated in FIG. 9, a short bit string may be allocated to the disparity motion vector predictor. Then the code amount including the allocation bit string may be applied to the selecting processing illustrated in FIG. 10. More specifically, the inter prediction control unit 121 may select a motion vector predictor such that the code amount is the smallest based on the code amount including the allocation bit string and the motion vector difference. With this, the motion vector predictor corresponding to a short bit string is preferentially selected.

Figure 12:
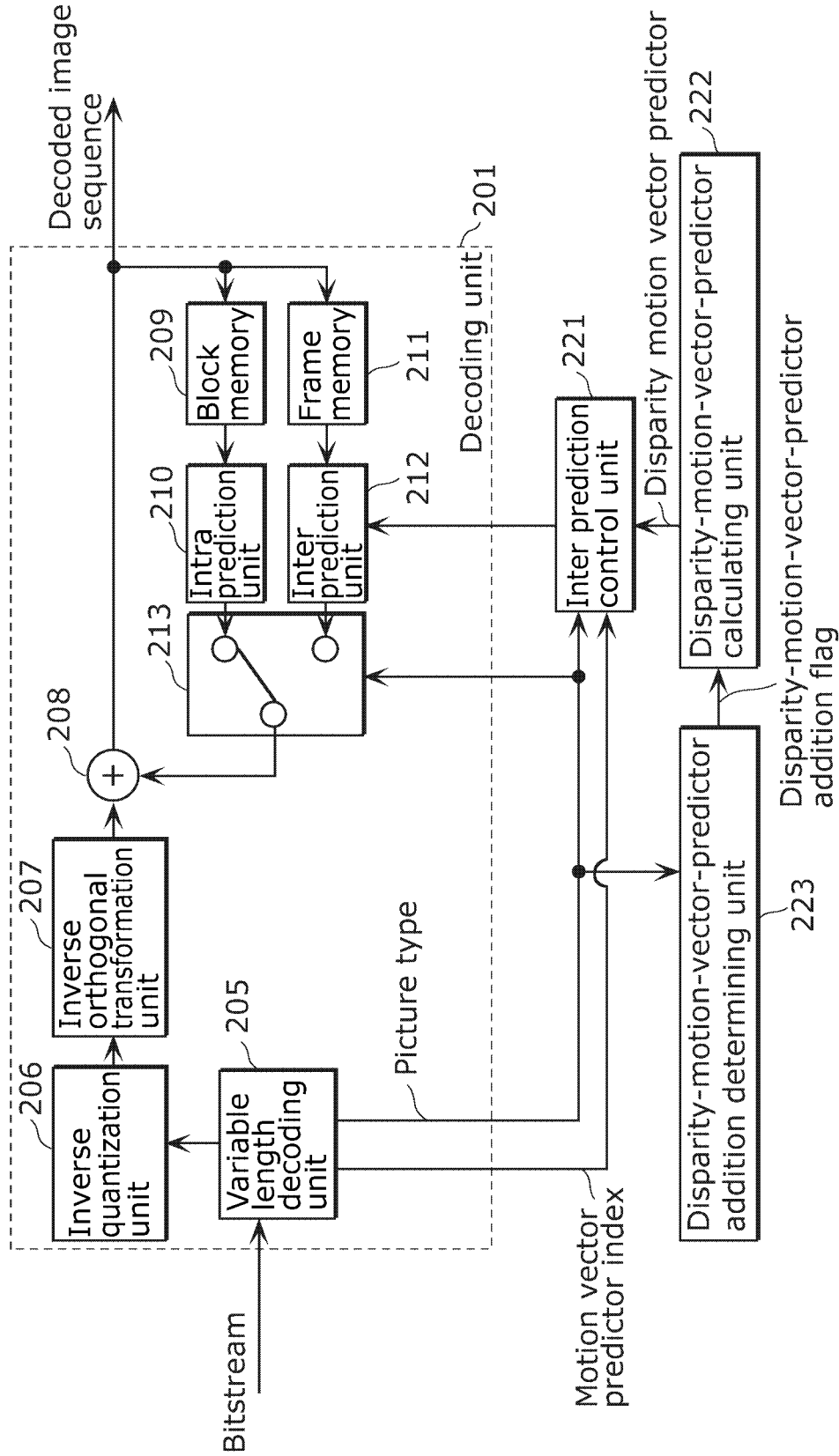
FIG. 12 is a configuration diagram which illustrates an image decoding apparatus according to Embodiment 1

FIG. 12 is a configuration diagram which illustrates the image decoding apparatus according to Embodiment 1 The image decoding apparatus illustrated in FIG. 12 includes: a decoding unit 201; an inter prediction control unit 221; a disparity-motion-vector-predictor calculating unit 222; and a disparity-motion-vector-predictor addition determining unit 223. The decoding unit 201 includes: a variable length decoding unit 205; an inverse quantization unit 206; an inverse orthogonal transformation unit 207; an adder 208; a block memory 209; an intra prediction unit 210; a frame memory 211; an inter prediction unit 212; and a switch 213.

The variable length decoding unit 205 performs variable length decoding on a bitstream that is provided, and decodes picture type information, a motion vector predictor index, prediction error data, and so on. The inverse quantization unit 206 performs inverse quantization on the prediction error data. The inverse orthogonal transformation unit 207 performs, on the prediction error data on which inverse quantization is performed, transformation from the frequency region to the image region. The adder 208 adds together the prediction image data and the prediction error data to generate decoded image data.

The block memory 209 is a memory for storing the decoded image data per block. The frame memory 211 is a memory for storing the decoded image data per frame.

The intra prediction unit 210 generates prediction image data of a current block to be decoded by performing intra prediction using the decoded image data per block stored in the block memory 209. The inter prediction unit 212 generates prediction image data of a current block to be decoded by performing inter prediction using the decoded image data per frame stored in the frame memory 211. The switch 213 switches a coding mode (decoding mode) between the intra prediction and the inter prediction.

The disparity-motion-vector-predictor addition determining unit 223 determines whether or not a disparity motion vector predictor is to be added. The disparity-motion-vector-predictor calculating unit 222 calculates the disparity motion vector predictor. The inter prediction control unit 221 selects a motion vector predictor from among one or more motion vector predictor candidates.

Processes performed by the inter prediction control unit 221 are the same as those performed by the inter prediction control unit 121 in coding. Processes performed by the disparity-motion-vector-predictor calculating unit 222 are the same as those performed by the disparity-motion-vector-predictor calculating unit 122 in coding. Processes performed by the disparity-motion-vector-predictor addition determining unit 223 are the same as those performed by the disparity-motion-vector-predictor addition determining unit 123 in coding.

In sum, in the above-described coding, the inter prediction control unit 221, the disparity-motion-vector-predictor calculating unit 222, and the disparity-motion-vector-predictor addition determining unit 223 are implemented by changing the part of coding into decoding. It is to be noted that the inter prediction control unit 221 selects a motion vector predictor from among the one or more motion vector predictor candidates, using the motion vector predictor index decoded by the variable length decoding unit 205.

Figure 13:
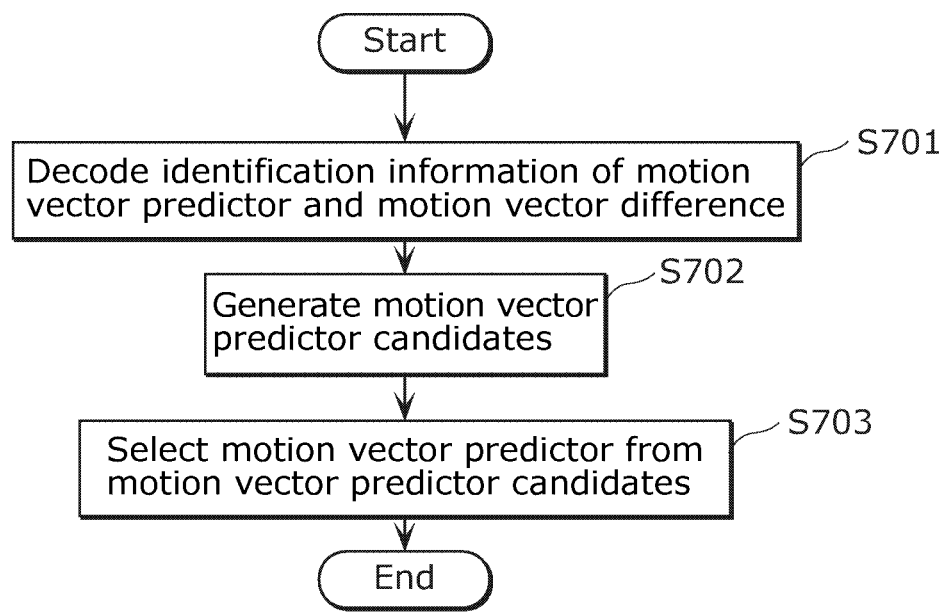
FIG. 13 is a flowchart which illustrates processes performed by the image decoding apparatus according to Embodiment 1.

FIG. 13 is a flowchart which illustrates processes of the image decoding apparatus according to Embodiment 1 illustrated in FIG. 12.

First, the variable length decoding unit 205 decodes the motion vector predictor index and the motion vector difference (S701). The motion vector predictor index is identification information for identifying a motion vector predictor that is selected at the time of coding. The motion vector difference is a difference between the motion vector of the current block to be decoded and the motion vector predictor selected at the time of coding.

Next, the disparity-motion-vector-predictor calculating unit 222 calculates the disparity motion vector predictor. The inter prediction control unit 221 generates a list of the motion vector predictor candidates (S702). This process is the same as the process performed in coding.

Next, the inter prediction control unit 221 selects a motion vector predictor from the list of the motion vector predictor candidates, using the decoded motion vector predictor index (S703). Subsequently, the inter prediction control unit 221 adds the motion vector difference and the motion vector predictor together, thereby obtaining a motion vector of the current image. The process of obtaining the motion vector may be performed by the inter prediction unit 212.

The decoded motion vector is used in generating prediction image data performed by the inter prediction unit 212. Then the image decoding apparatus implements motion compensation using the decoded motion vector.

As described above, the image coding apparatus selects a motion vector predictor to be used in the prediction of a motion vector, from among motion vector predictor candidates including the disparity motion vector predictor. With this, the coding efficiency of the motion vector is improved and the coding efficiency for the image is improved. The image decoding apparatus is capable of decoding an image that is coded with high coding efficiency, by performing the same processes as those in coding.

(Modification)

The image coding apparatus illustrated in FIG. 1 is a specific example of the image coding apparatus according to the present invention, and thus the image coding apparatus according to the present invention is not limited to the specific example illustrated in FIG. 1. In addition, the image decoding apparatus illustrated in FIG. 12 is a specific example of the image decoding apparatus according to the present invention, and the image decoding apparatus according to the present invention is not limited to the specific example illustrated in FIG. 12. The following describes, as modifications, an image coding apparatus including main structural elements out of the plurality of the structural elements illustrated in FIG. 1, and an image decoding apparatus including main structural elements out of the plurality of the structural elements illustrated in FIG. 12.

Figure 14:
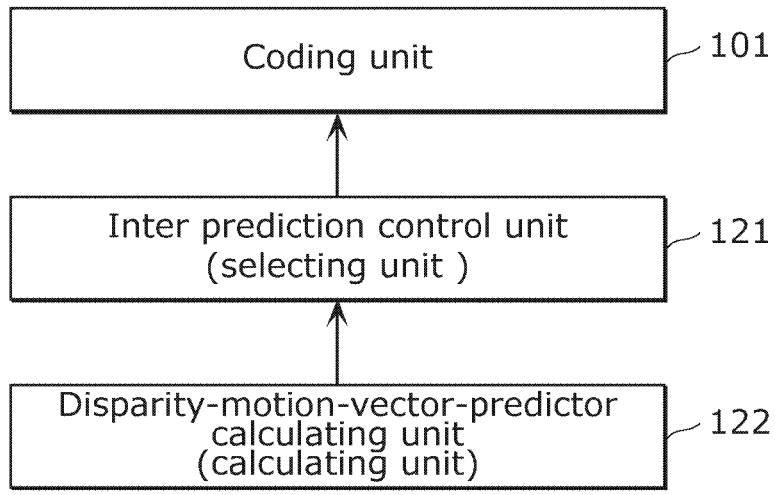
FIG. 14 is a configuration diagram which illustrates an image coding apparatus according to a modification example of Embodiment 1.

FIG. 14 is a configuration diagram which illustrates an image coding apparatus according to a modification example of Embodiment 1. The image coding apparatus illustrated in FIG. 14 is an image coding apparatus which codes an image on a block-by-block basis and includes a disparity-motion-vector-predictor calculating unit (also simply referred to as a calculating unit) 122, an inter prediction control unit (also referred to as a selecting unit) 121, and a coding unit 101. The configuration of the image coding apparatus according to this modification is not limited to other structural elements illustrated in FIG. 1. In particular, the specific configuration of the coding unit 101 illustrated in FIG. 1 is also an example.

The disparity-motion-vector-predictor calculating unit 122 calculates a disparity motion vector predictor from the motion vector of a disparity block. Here, the disparity block is a block which has a relationship of disparity with the current field to be coded and which is located at a position corresponding to a spatial position of the current block in an image. The disparity motion vector predictor is a vector for predicting a motion vector of the current block.

The inter prediction control unit 121 selects a motion vector predictor to be used in the prediction of a motion vector of the current block, from among one or more motion vector predictor candidates including the disparity motion vector predictor.

The coding unit 101 codes identification information and a motion vector difference. The identification information corresponds to a motion vector predictor selected from the one or more motion vector predictor candidates. The motion vector difference is a difference between the motion vector of the current block and the motion vector predictor.

With this, the disparity motion vector predictor for predicting a motion vector with high accuracy is added to the list of the motion vector predictor candidates. Thus, the motion vector is predicted with high accuracy. Therefore, an image is coded with high coding efficiency.

Figure 15:
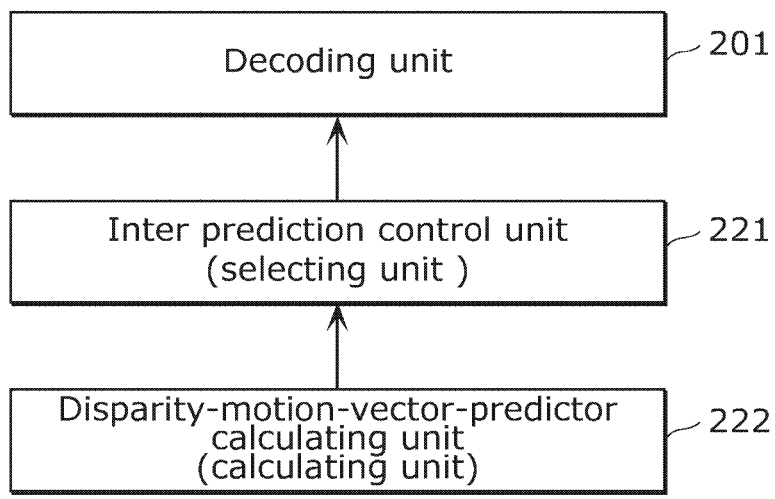
FIG. 15 is a configuration diagram which illustrates an image decoding apparatus according to a modification example of Embodiment 1.

FIG. 15 is a configuration diagram which illustrates the image decoding apparatus according to the modification of Embodiment 1. The image decoding apparatus illustrated in FIG. 15 is an image decoding apparatus which decodes a coded image on a block-by-block basis and includes a disparity-motion-vector-predictor calculating unit (also simply referred to as a calculating unit) 222, an inter prediction control unit (also referred to as a selecting unit) 221, and a decoding unit 201. The configuration of the image decoding apparatus according to this modification is not limited to other structural elements illustrated in FIG. 12. In particular, the specific configuration of the decoding unit 201 illustrated in FIG. 12 is also an example.

The disparity-motion-vector-predictor calculating unit 222 calculates a disparity motion vector predictor from the motion vector of a disparity block. Here, the disparity block is a block which has a relationship of disparity with the current field to be decoded and which is located at a position corresponding to a spatial position of the current block in an image. The disparity motion vector predictor is a vector for predicting the motion vector of the current block.

The decoding unit 201 decodes identification information and a motion vector difference. Here, the identification information corresponds to the motion vector predictor selected from one or more motion vector predictor candidates including the disparity motion vector predictor. The motion vector difference is a difference between the motion vector of the current block and the motion vector predictor.

The inter prediction control unit 221 selects a motion vector predictor from among the one or more motion vector predictor candidates, using the identification information.

With this, the disparity motion vector predictor for predicting a motion vector with high accuracy is added to the list of the motion vector predictor candidates. Thus, the motion vector is predicted with high accuracy. It is therefore possible to decode the image that is coded with high coding efficiency.

It is to be noted that part of the structural elements illustrated in FIG. 1 or FIG. 12 may be added to the image coding apparatus and the image decoding apparatus which are illustrated in this modification. In particular, a disparity addition determining unit (also referred simply as a determining unit) 123 may be added to the image coding apparatus of the modification. In addition, a disparity addition determining unit (also referred simply as a determining unit) 223 may be added to the image decoding apparatus of the modification. Furthermore, the image coding apparatus and the image decoding apparatus according to this modification may additionally perform other operations described in Embodiment 1.

(Embodiment 2)

The disparity motion vector predictor illustrated in Embodiment 1 may be applied to multiview video image coding. Embodiment 2 describes an example of application to the multiview video image coding It is to be noted that the configurations of the image coding apparatus and the image decoding apparatus according to Embodiment 2 are the same as the configurations of the image coding apparatus and the image decoding apparatus according to Embodiment 1.

The multiview video image coding is a technique for coding an image including a plurality of views. Expressions of the same parity and the disparity are used also in a plurality of views in some cases.

When two pictures belong to the same view, these two pictures are the same parity. Alternatively, these two pictures are described as having the relationship of the same parity. When two pictures each belong to a different view, these two pictures are disparity. Alternatively, these two pictures are described as having the relationship of disparity.

Figure 16:
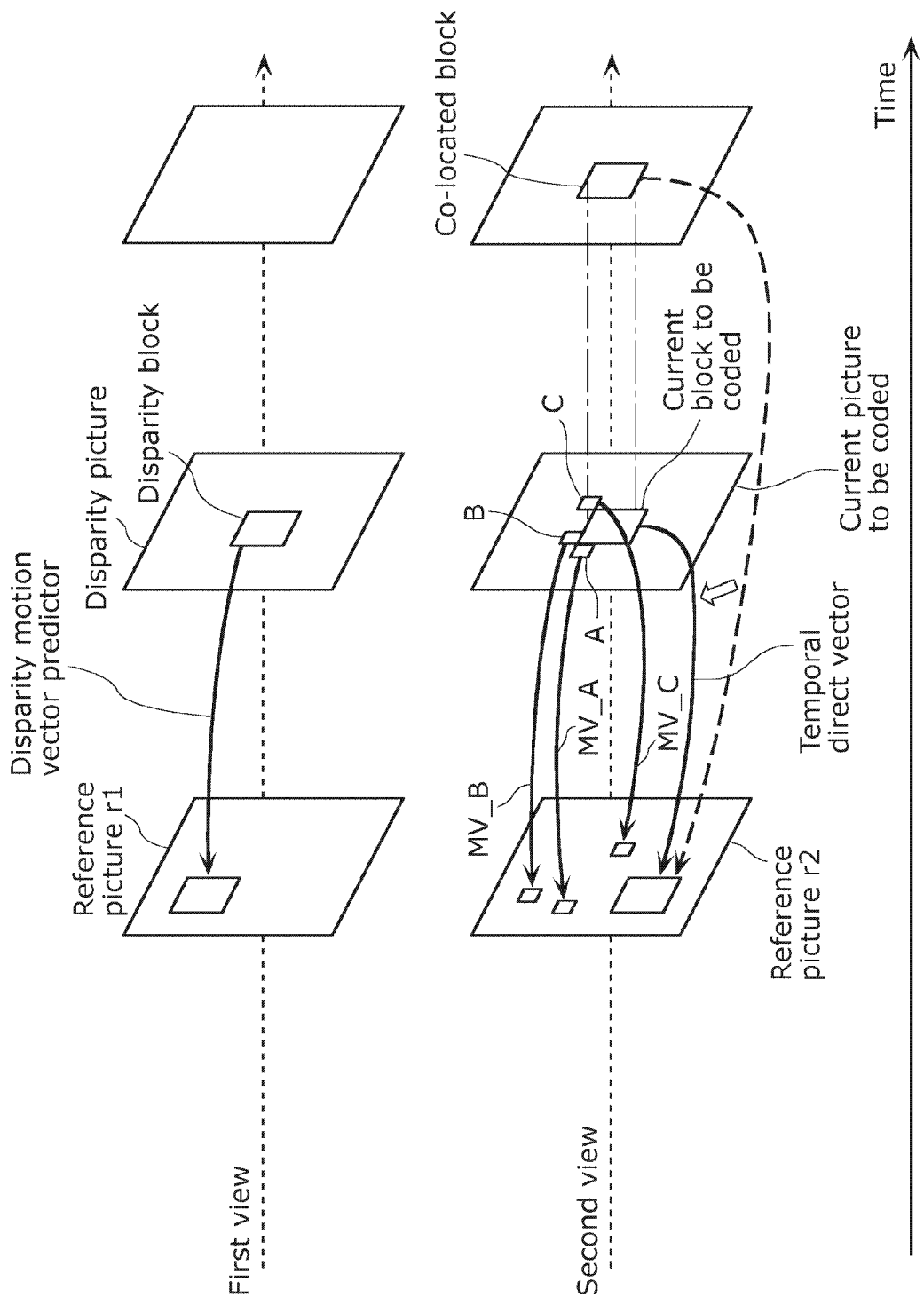
FIG. 16 is an overall conceptual diagram which illustrates a motion vector predictor candidate according to Embodiment 2.

FIG. 16 is an overall conceptual diagram which illustrates a motion vector predictor candidate according to Embodiment 2. As illustrated in FIG. 16, the motion vector predictor candidate according to Embodiment 2 is described by substantially the same concept as that in FIG. 2 according to Embodiment 1. In FIG. 16, the first view, the second view, reference pictures r1 and r2, a disparity picture, and so on are shown. They correspond respectively to the first field, the second field, the reference fields t1 and b1, and the disparity field illustrated in FIG. 2.

The disparity picture and the reference picture 1 belong to the first view. The current picture to be coded and the reference picture 2 belong to the second view. The current picture and the disparity picture have the relationship of disparity. For example, the first view is a base view and the second view is a non-base view.

In addition, in the example illustrated in FIG. 16, the reference picture r1 and the reference picture r2 are same in the display order, and thus displayed at the same time. Furthermore, the current picture and the disparity picture are also same in the display order, and thus displayed at the same time. The disparity block is a block included in the disparity picture and located at a position corresponding to a position of the current block.

In the same manner as Embodiment 1, the disparity motion vector predictor is derived also in the relationship described above.

Here, the spatial position of the disparity block in the disparity picture is typically the same as the spatial position of the current block in the current picture. However, the spatial position of the disparity block in the disparity picture may be different from the spatial position of the current block in the current picture. For example, the position of the disparity block may be a position that is obtained by shifting from the position of the current block by a distance corresponding to parallax between the views.

Figure 17:
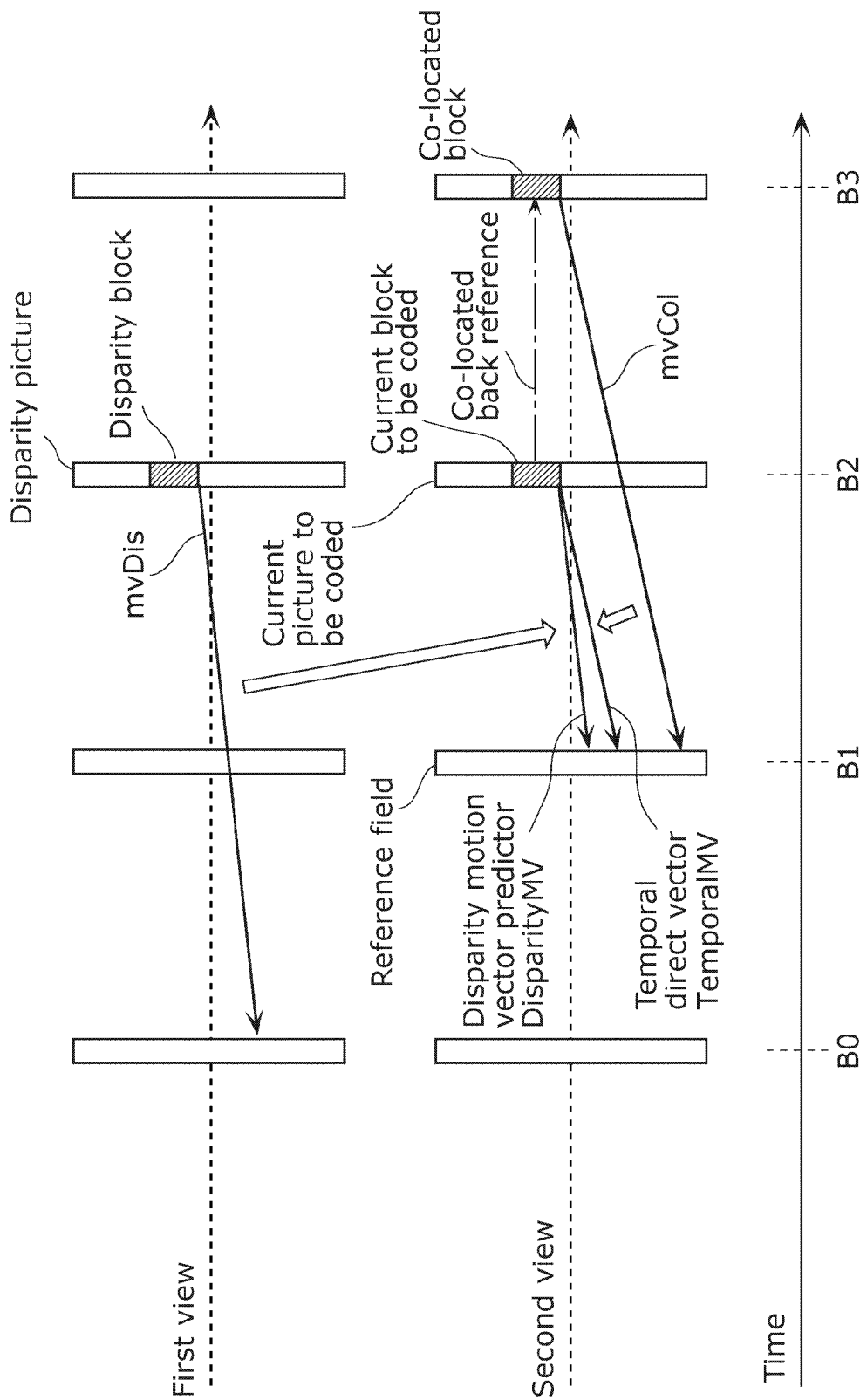
FIG. 17 is a diagram which illustrates a temporal direct vector and a disparity motion vector predictor according to Embodiment 2.

FIG. 17 is a diagram which illustrates a temporal direct vector and a disparity motion vector predictor according to Embodiment 2. As illustrated in FIG. 17, the disparity motion vector predictor is also described as being substantially the same as that in FIG. 4 according to Embodiment 1.

A motion vector mvDis of the disparity block indicates a picture at the time B0 from a picture at the time B2. In such a case, the disparity motion vector predictor DisparityMV that indicates the picture at the time B1 from the current block is calculated by Expression 3.

$$\text{DisparityMV} = mvDis \times (B2-B1)/(B2-B0) \quad \text{(Expression 3)}$$

As shown in Expression 3, the disparity motion vector predictor DisparityMV is obtained by multiplying the motion vector mvDis of the disparity block by a ratio corresponding to time.

Here, the disparity motion vector predictor DisparityMV may be used only when B2−B1 and B2−B0 are the same, that is, in the case of (B2−B1)/B2−B0)=1, in order to reduce the processing load of multiplication of Expression 3. In this case, the motion vector mvDis of the disparity block is directly used as the disparity motion vector predictor DisparityMV.

The disparity motion vector predictor of Embodiment 2 may be used instead of the disparity motion vector predictor of Embodiment 1, or may be used in addition to the disparity motion vector predictor of Embodiment 1.

More specifically, the inter prediction control unit 121 in the image coding apparatus calculates the disparity motion vector predictor for predicting a motion vector of the current block to be coded included in the second view, from the motion vector of the disparity block included in the first view. Here, the first view and the second view are included in an image that is a multiview video image, and are different from each other.

Likewise, the inter prediction control unit 221 in the image decoding apparatus calculates the disparity motion vector predictor for predicting a motion vector of the current block to be decoded included in the second view, from the motion vector of the disparity block included in the first view.

Other operations are the same as those in Embodiment 1. In sum, the first field and the second field in Embodiment 1 are replaced with the first view and the second view according to a multiview video image in Embodiment 2. With this, the disparity motion vector predictor is applied to the multiview video image.

It is to be noted that, although two views are illustrated in Embodiment 2, three or more views may be used. In addition, a plurality of disparity motion vector predictors may be used which correspond to a plurality of views in which the current picture is not included. On the other hand, only the disparity motion vector predictor corresponding to the base view may be used for simplifying the processing.

In addition, the disparity motion vector predictor is typically calculated from a motion vector of the disparity block included in the temporally same picture as the current picture. However, the disparity motion vector predictor may be calculated from a motion vector of the disparity block included in a picture temporally different from the current picture.

Furthermore, as described above, the image coding apparatus and the image decoding apparatus according to Embodiment 2 use a picture in the same way as the field described in Embodiment 1. In particular, the image coding apparatus and the image decoding apparatus according to Embodiment 2 are capable of executing the operation illustrated in FIG. 7 and FIG. 9 by regarding the field in Embodiment 1 as a picture. For example, the disparity motion vector predictor may be used only when the motion vector of the disparity block refers to the same parity.

(Embodiment 3)

Embodiment 3 describes a specific example for transmitting the number of added motion vector predictor candidates to the decoding side. When a motion vector predictor candidate is generated in the same way in coding and decoding, a motion vector predictor index corresponding to the motion vector predictor candidate indicates also the same value in the coding and the decoding. Thus, the image coding apparatus does not have to transmit the number of the motion vector predictor candidates to the decoding side. However, there is a case where the processing amount increases due to calculation and addition of the motion vector predictor candidates.

In view of the above, an image coding apparatus according to Embodiment 3 limits the number of the motion vector predictor candidates which are calculated by referring to a picture or a field in which the current block is not included. Then the image coding apparatus transmits the limited number to the image decoding apparatus. With this, it is possible to implement both improvement of the prediction accuracy of a motion vector and reduction of increase in the processing amount in the image coding apparatus and the image decoding apparatus.

It is to be noted that the configurations of the image coding apparatus and the image decoding apparatus according to Embodiment 3 are the same as the configurations of the image coding apparatus and the image decoding apparatus according to Embodiment 1.

Figure 18:
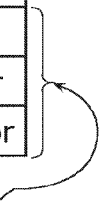
FIG. 18 is a diagram which illustrates a list of the motion vector predictor candidates according to Embodiment 3.

FIG. 18 is a diagram which illustrates a list of the motion vector predictor candidates according to Embodiment 3. A temporal direct vector, the first disparity motion vector predictor and the second disparity motion vector predictor are each a motion vector predictor candidate calculated by referring to a picture or a field in which the current block is not included. As illustrated in FIG. 18, there is a case where a plurality of disparity motion vector predictors are included in the motion vector predictor candidate.

The temporal direct vector is calculated from a motion vector of a co-located block. The first disparity motion vector predictor is calculated from, for example, a disparity block that belongs to a disparity field illustrated in FIG. 2. The second disparity motion vector predictor is calculated from, for example, a disparity block that belongs to a disparity picture illustrated in FIG. 16.

In the example illustrated in FIG. 18, the number of the motion vector predictor candidates which are calculated by referring to a picture or a field in which the current block is not included is three. In contrast, when the number of the motion vector predictor candidates which are calculated by referring to a different picture or a different field is limited to three, the image coding apparatus calculates three or less additional candidates. In sum, the number of additional candidates is a limit value. The limit value may be predetermined according to the characteristics of an image.

In addition, the image coding apparatus may calculate additionally motion vector predictor candidates of a smaller number than the limit value of the additional candidates, according to an upper limit corresponding to all of the motion vector predictor candidates.

Then the image coding apparatus codes the number of the additional motion vector predictor candidates. More specifically, the variable length coding unit 105 in the image coding apparatus illustrated in FIG. 1 codes, out of one or more motion vector predictor candidates, the number of the motion vector predictor candidates calculated respectively from a motion vector of a field or a picture in which the current block to be coded is not included.

On the other hand, the image decoding apparatus obtains a coded stream generated by the image coding apparatus and decodes the number of the additional motion vector predictor candidates. More specifically, the variable length decoding unit 205 in the image decoding apparatus illustrated in FIG. 12 decodes, out of one or more motion vector predictor candidates, the number of the motion vector predictor candidates calculated respectively from a motion vector of a field or a picture in which the current block to be decoded is not included. Then the inter prediction control unit 221 refers to a different picture or a deferent field and calculates the motion vector predictor candidates of the decoded number.

Figure 19:
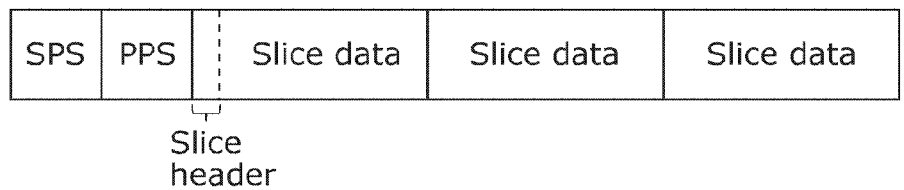
FIG. 19 is a diagram which illustrates a coded stream according to Embodiment 3.

FIG. 19 is a diagram which illustrates a coded stream according to Embodiment 3. For example, the variable length coding unit 105 inserts, into the coded stream illustrated in FIG. 19, the number of the additional motion vector predictor candidates calculated by referring to a different picture or a different field. Then the variable length decoding unit 205 obtains the number of the additional motion vector predictor candidates from the coded stream.

For example, the above-described number of the additional motion vector predictor candidates is inserted into SPS (sequence parameter set), PPS (picture parameter set) or a slice header.

With this, operations of coding and decoding are matched. It is therefore possible to implement both improvement of the prediction accuracy of a motion vector and reduction of increase in the processing amount in coding and decoding.

The image coding apparatus and the image decoding apparatus according to the present invention have been described above based on the embodiments; however, the present invention is not limited to the embodiments. Other forms in which various modifications apparent to those skilled in the art are applied to the embodiments, or forms structured by combining elements of different embodiments are included within the scope of the present invention.

For example, processes performed by a specific processing unit may be performed by a different processing unit. In addition, the order in which processes are performed may be changed, or a plurality of processes may be performed in parallel.

In addition, the image coding apparatus and the image decoding apparatus according to the present invention may be implemented as an image coding and decoding apparatus that is implemented by combining arbitrary structural elements included in the image coding apparatus and the image decoding apparatus.

Furthermore, the present invention can be implemented not only as the image coding apparatus and the image decoding apparatus but also as a method in which the processing units which constitute the image coding apparatus and the image decoding apparatus are included as steps. The present invention can be implemented as a program for causing a computer to execute the steps included in the method. In addition, the present invention can be implemented as a computer readable recording medium such as a CD-ROM having the program recorded thereon.

In addition, the structural elements included in the image coding apparatus and the image decoding apparatus may be implemented as a Large-Scale Integration (LSI) These structural elements may be realized as a single chip one-by-one, or as a single chip to include part or all of them. The name used here is LSI, but it may also be called Integrated circuit (IC), system LSI, super LSI, or ultra LSI depending on the degree of integration.

Moreover, ways to achieve integration are not limited to the LSI, and a special circuit or a general purpose processor and so forth can also achieve the integration. It is also possible to use a filed programmable gate array (FPGA) which can be programmed, or a reconfigurable processor in which connection and setting of circuit cells inside an LSI can be reconfigured.

In addition, in the future, with advancement in semiconductor technology, a brand-new technology may replace LSI. The structural elements included in the image coding apparatus and the image decoding apparatus can be integrated using such a technology.

(Embodiment 4)

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 20:
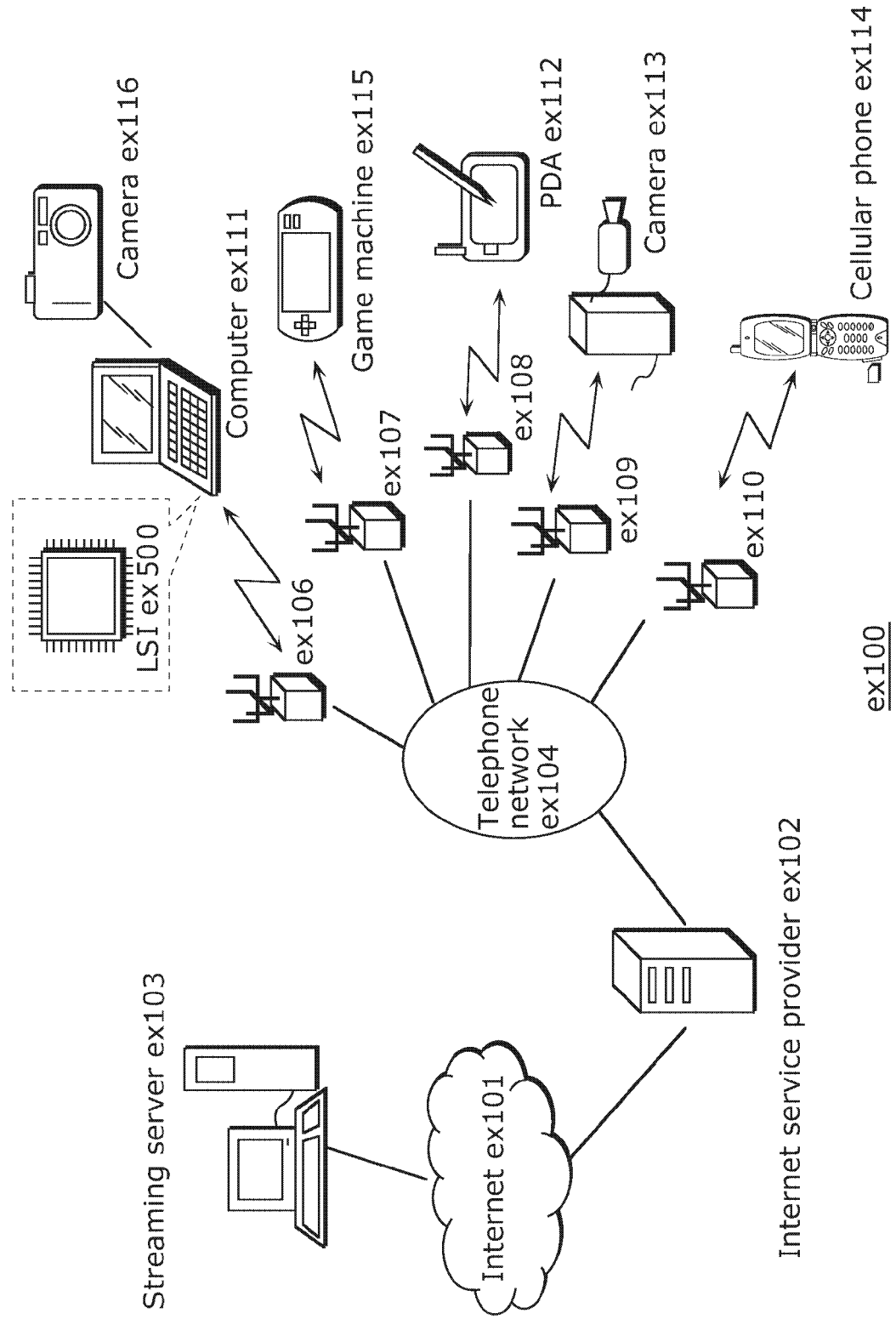
FIG. 20 shows an overall configuration of a content providing system for implementing content distribution services.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 110, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus in the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus in the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100, in other words, the clients can receive and decode information transmitted by the user, and reproduce the decoded data in real time in the content providing system ex100, so that the user who does not have any particular right and equipment can implement personal broadcasting.

Figure 21:
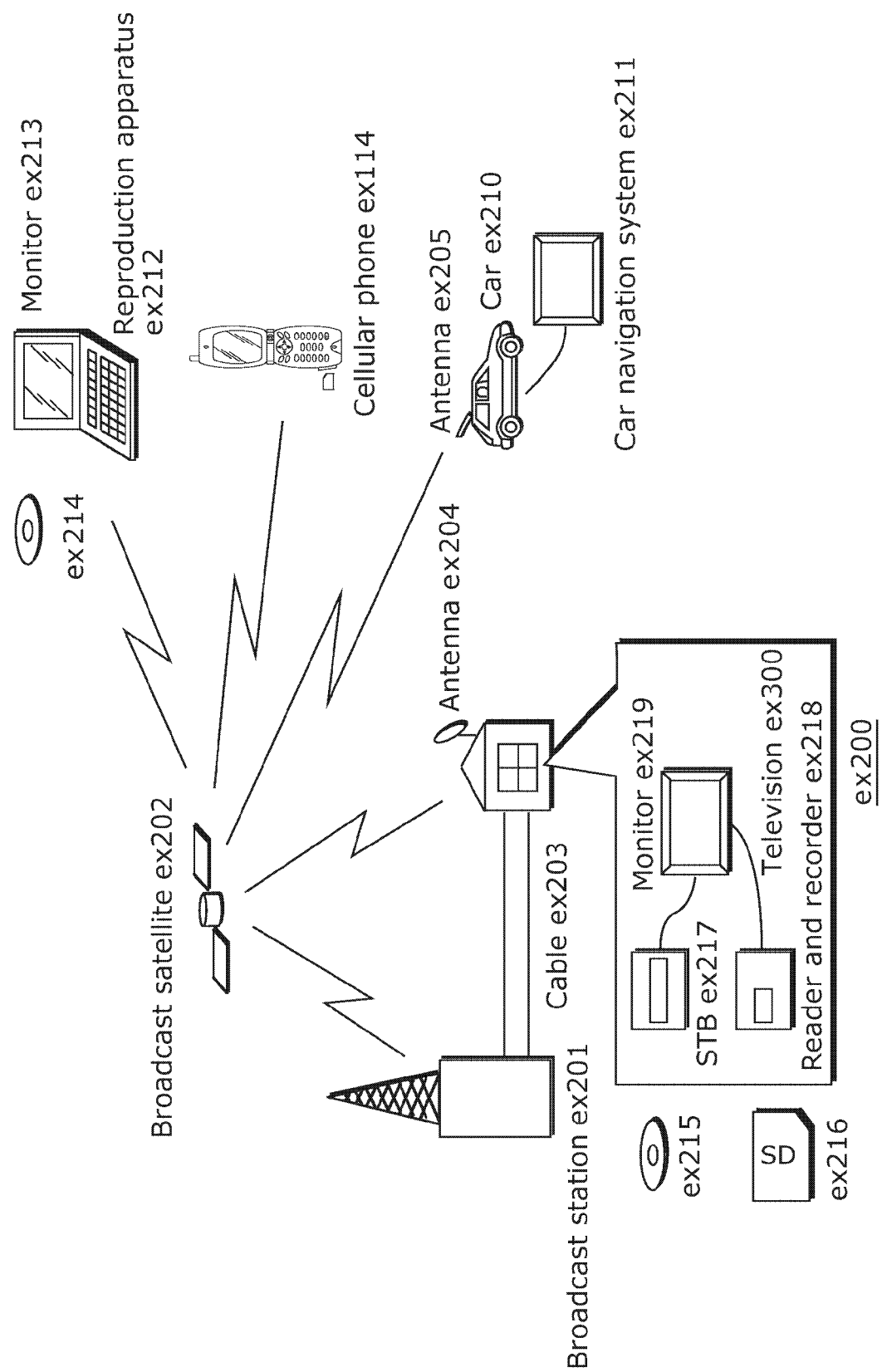
FIG. 21 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 21. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus in the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus in the present invention).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
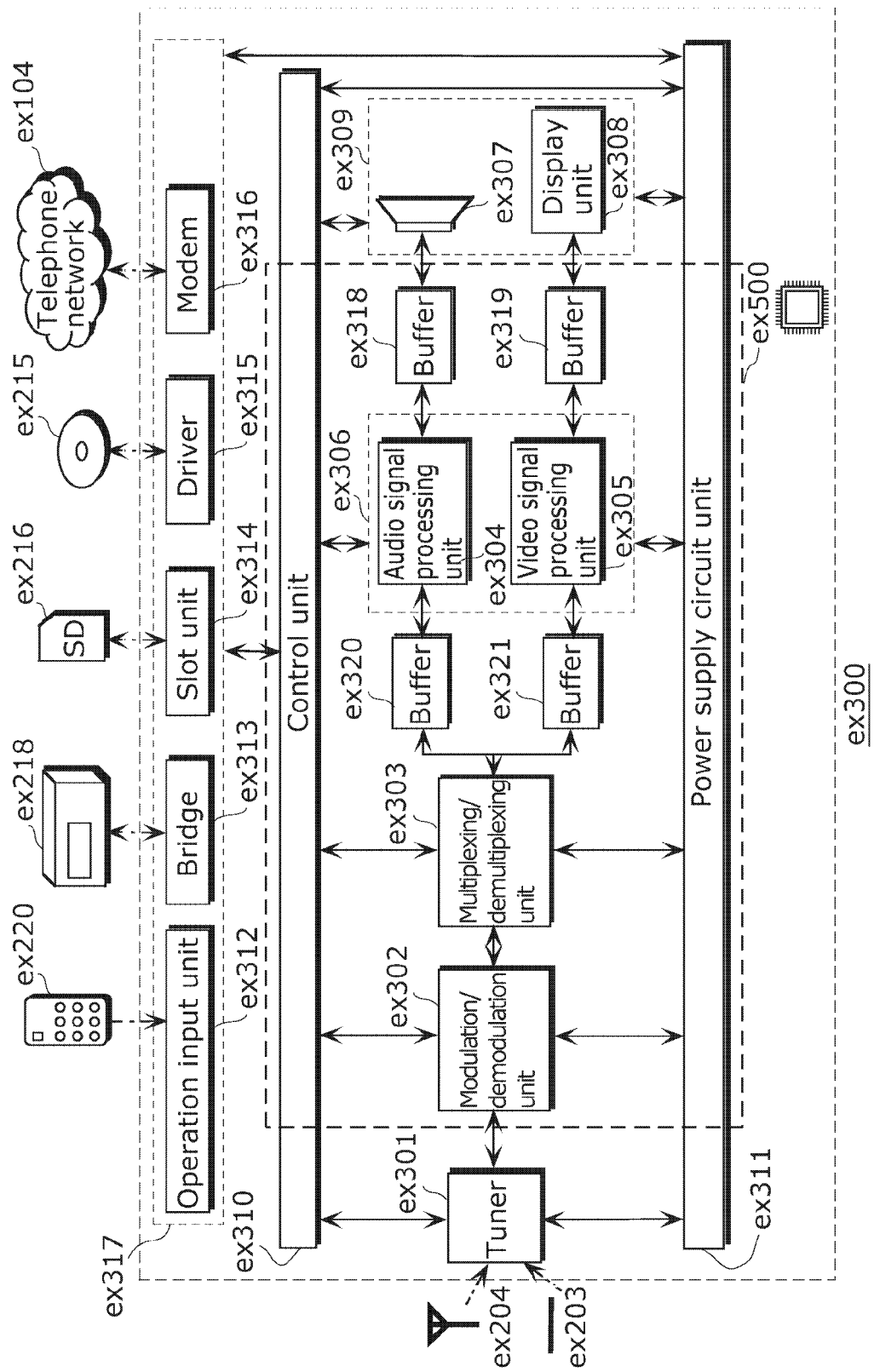
FIG. 22 shows a block diagram illustrating an example of a configuration of a television.

FIG. 22 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus in the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 23:
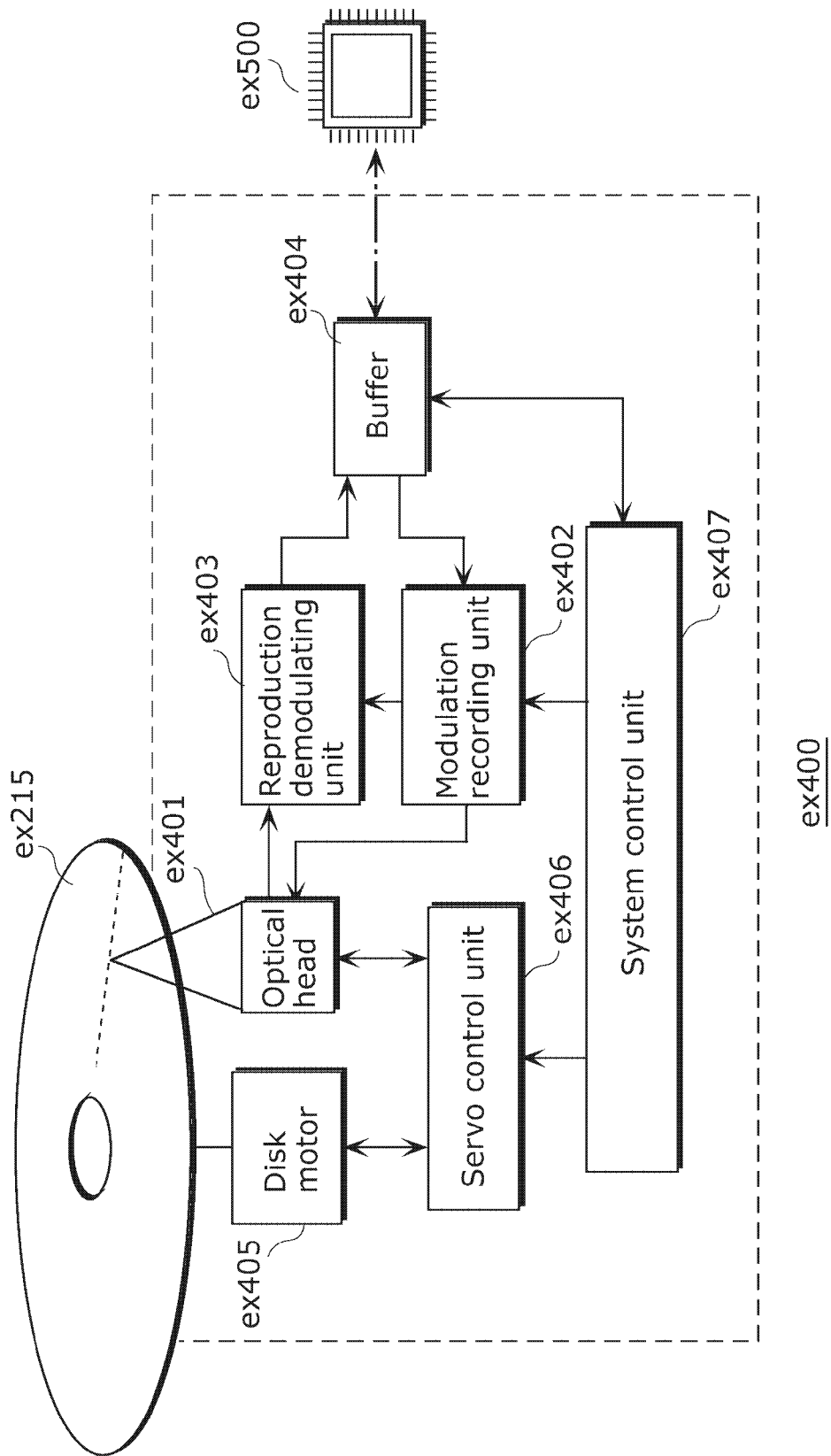
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
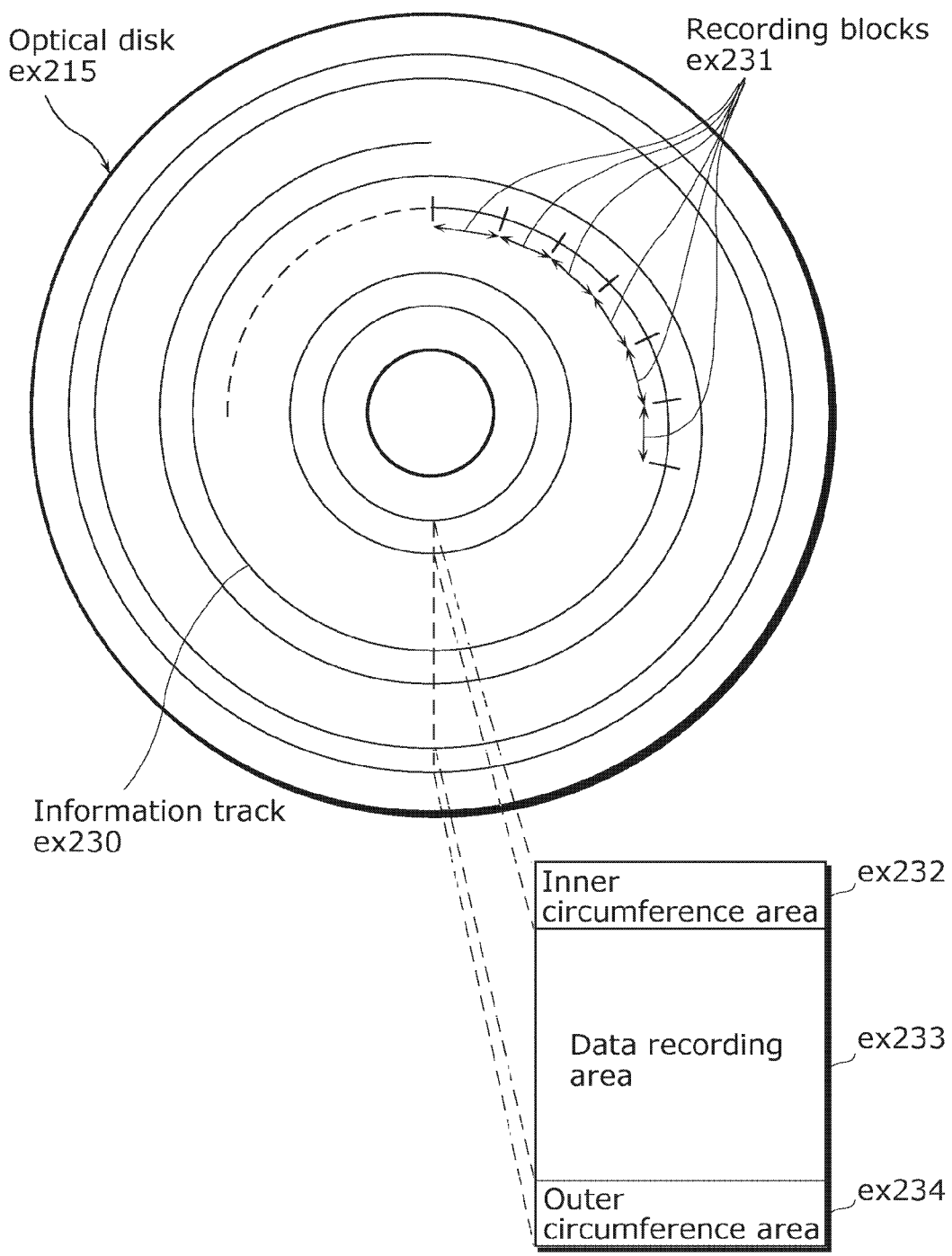
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
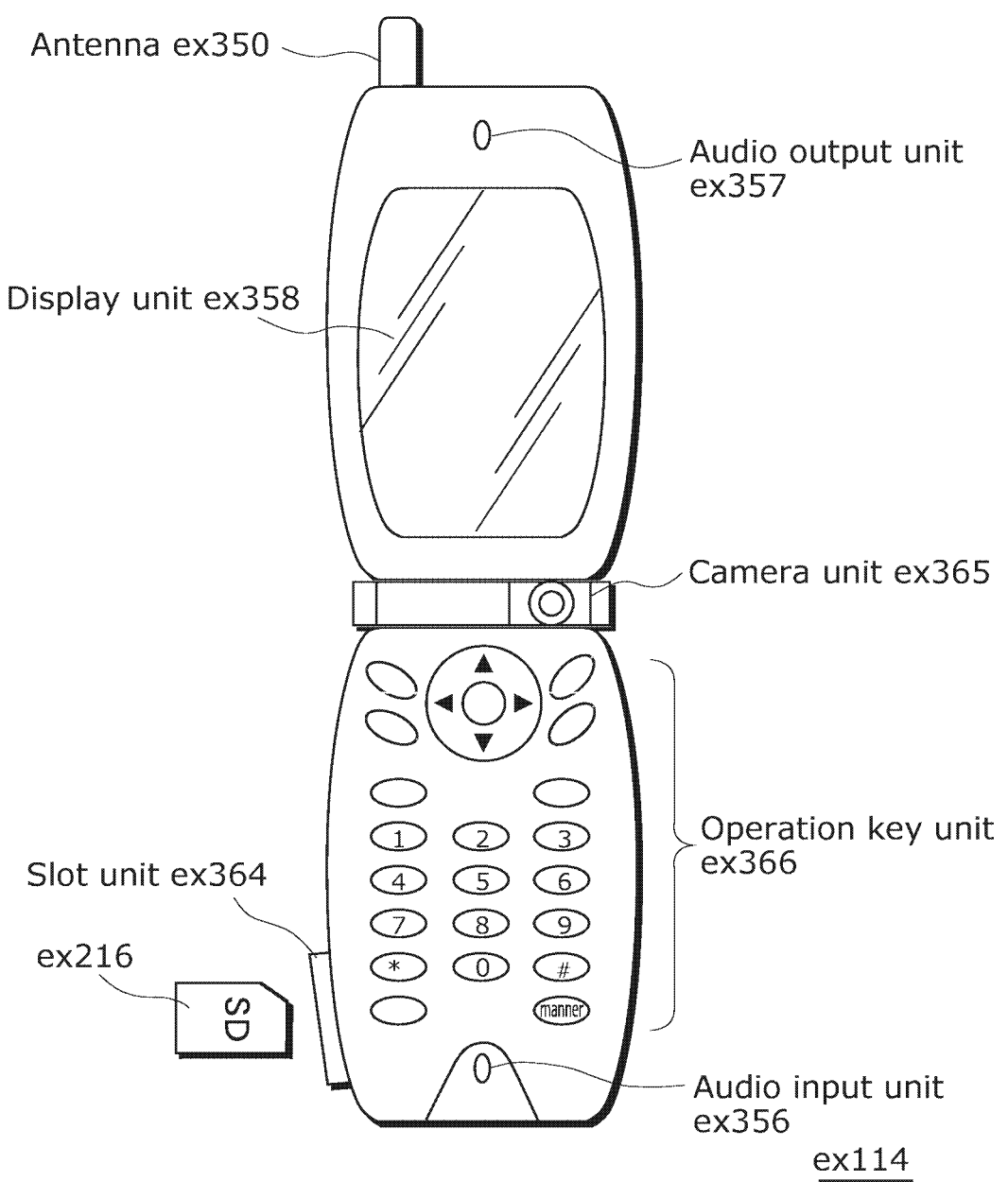
FIG. 25A shows an example of a cellular phone.

FIG. 25A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 25B:
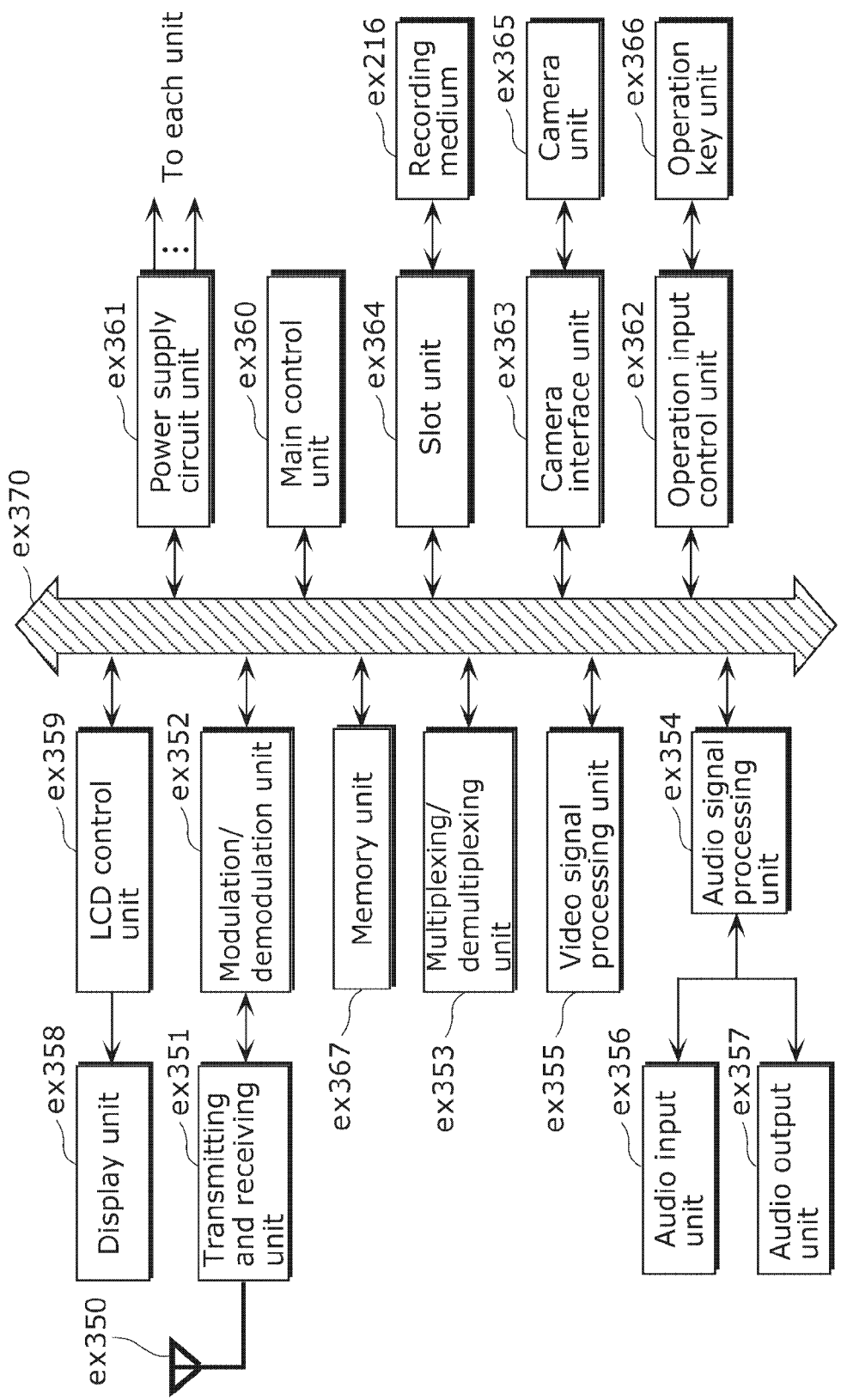
FIG. 25B is a block diagram showing an example of a configuration of a cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus in the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus in the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

(Embodiment 5)

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 26:
FIG. 26 illustrates a structure of multiplexed data.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 27:
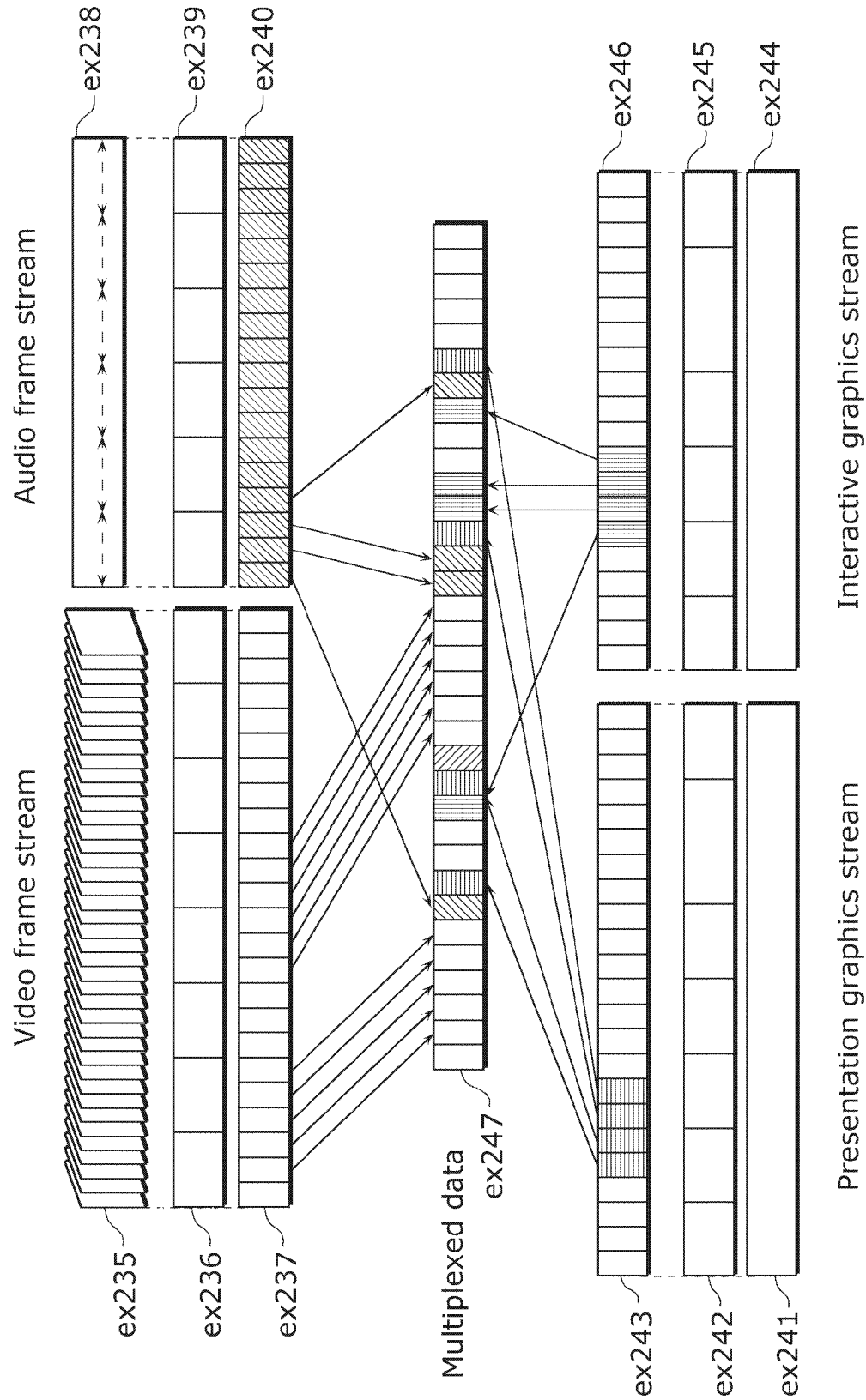
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
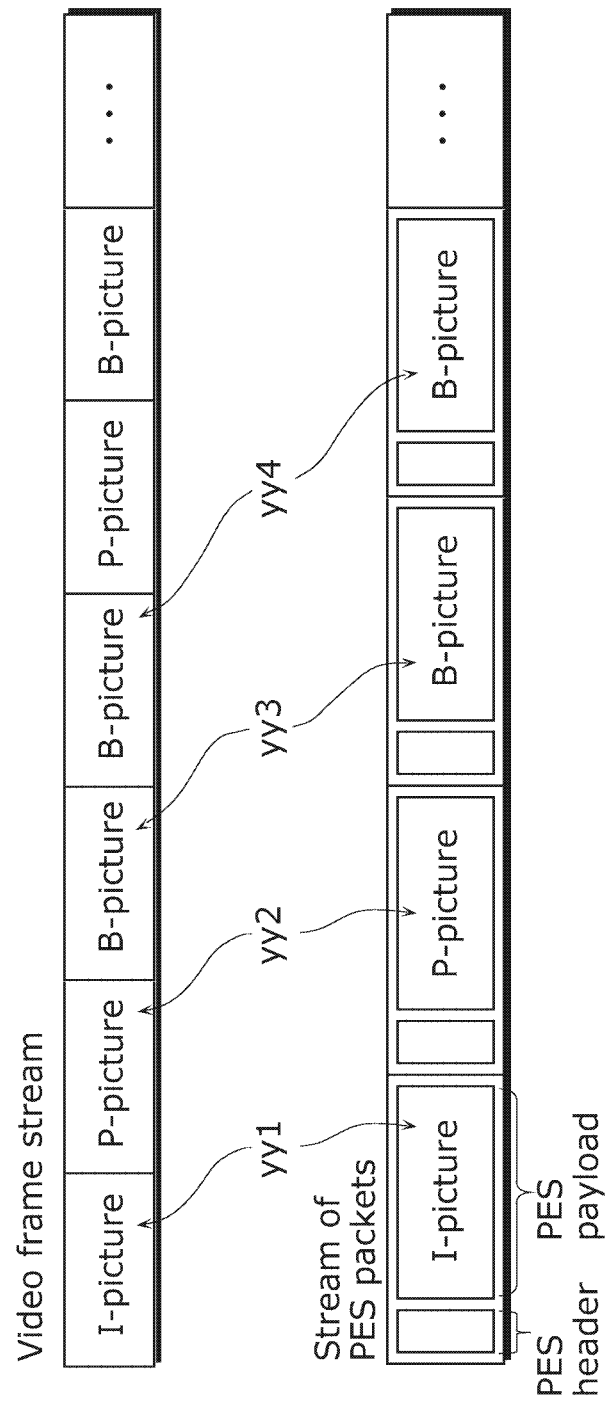
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 29:
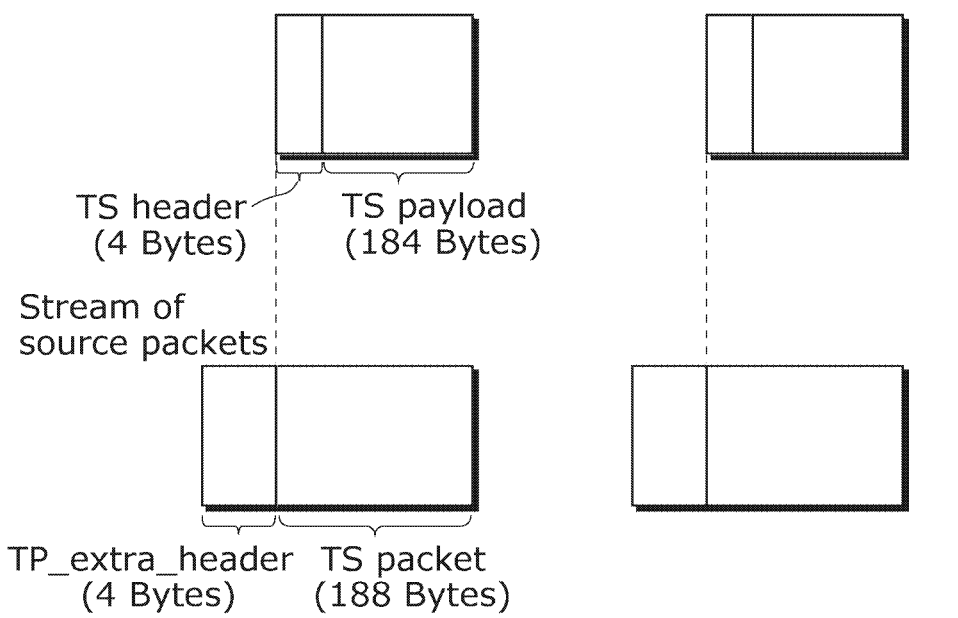
FIG. 29 shows a structure of TS packets and source packets in the multiplexed data.
Figure 29:
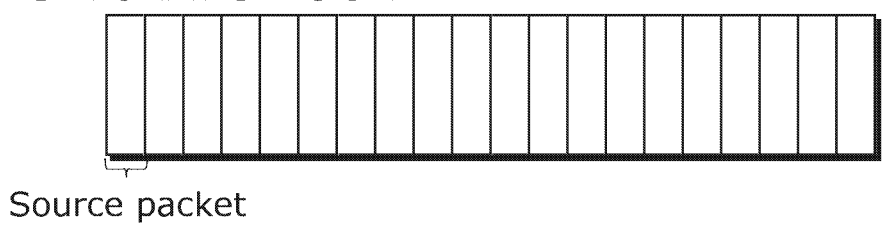

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
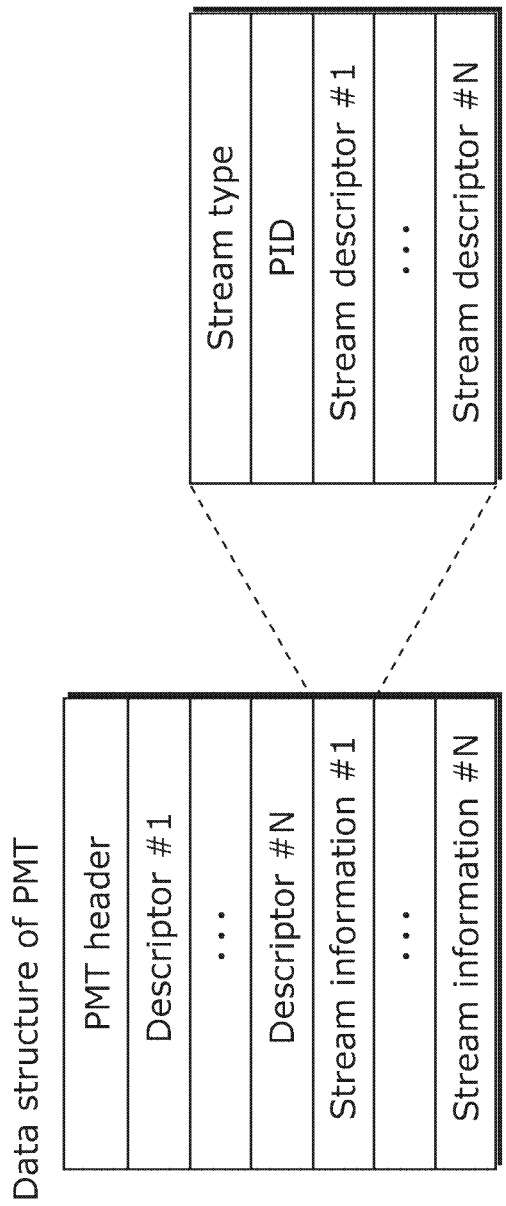
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
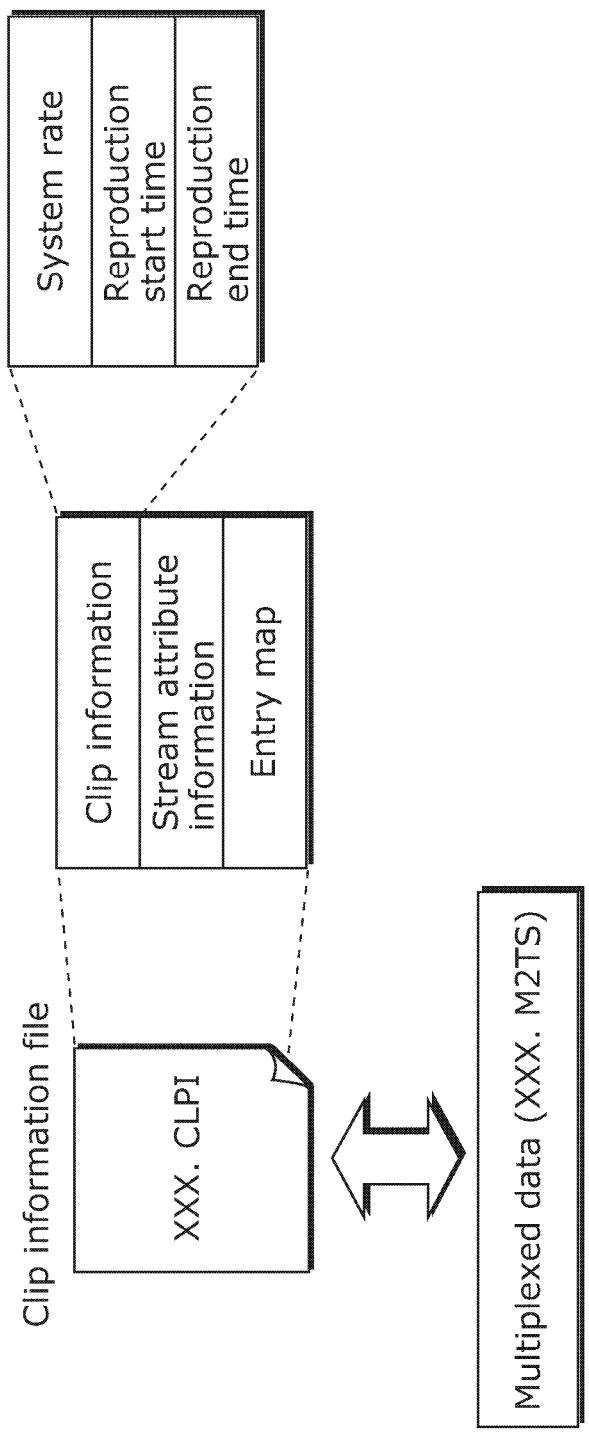
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data includes a system rate, a reproduction start time, and a reproduction end time, The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
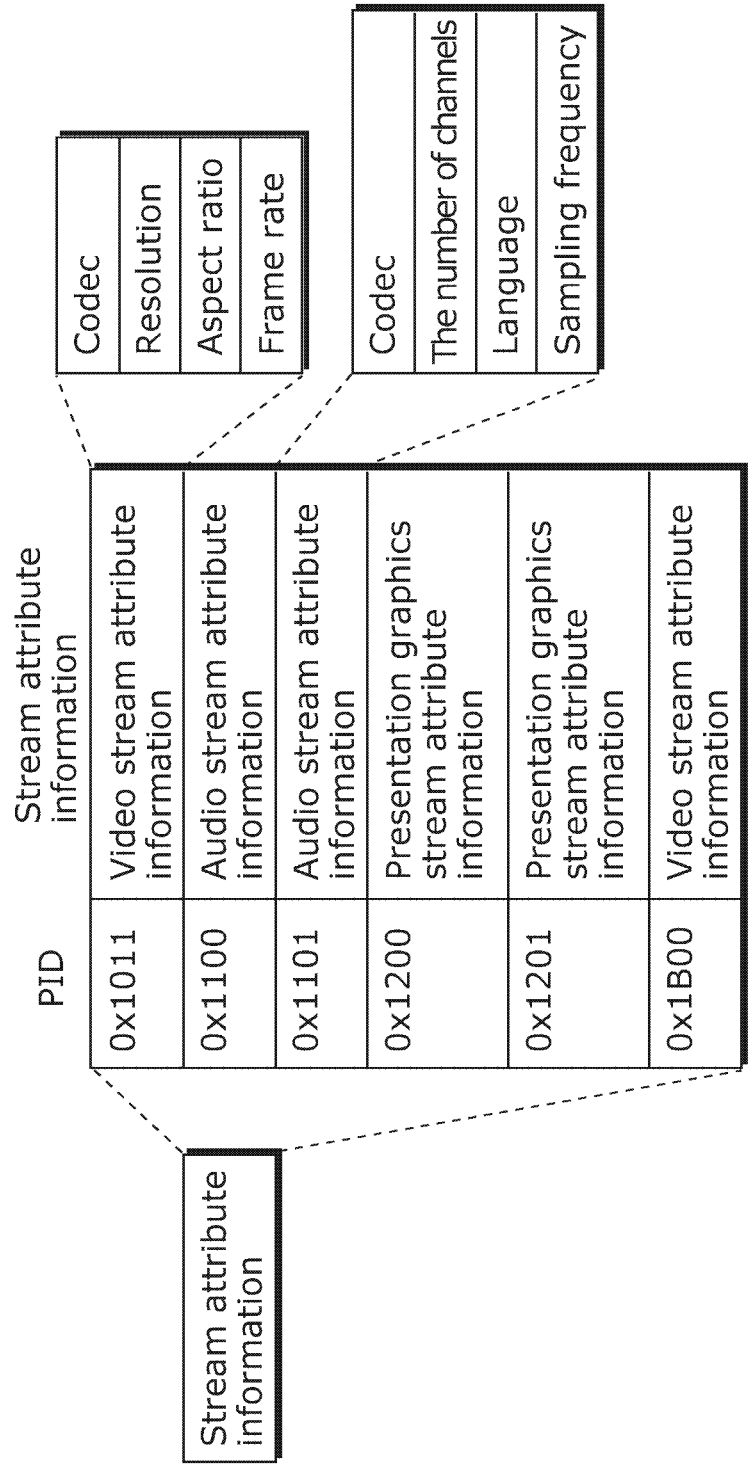
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

n the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 33:
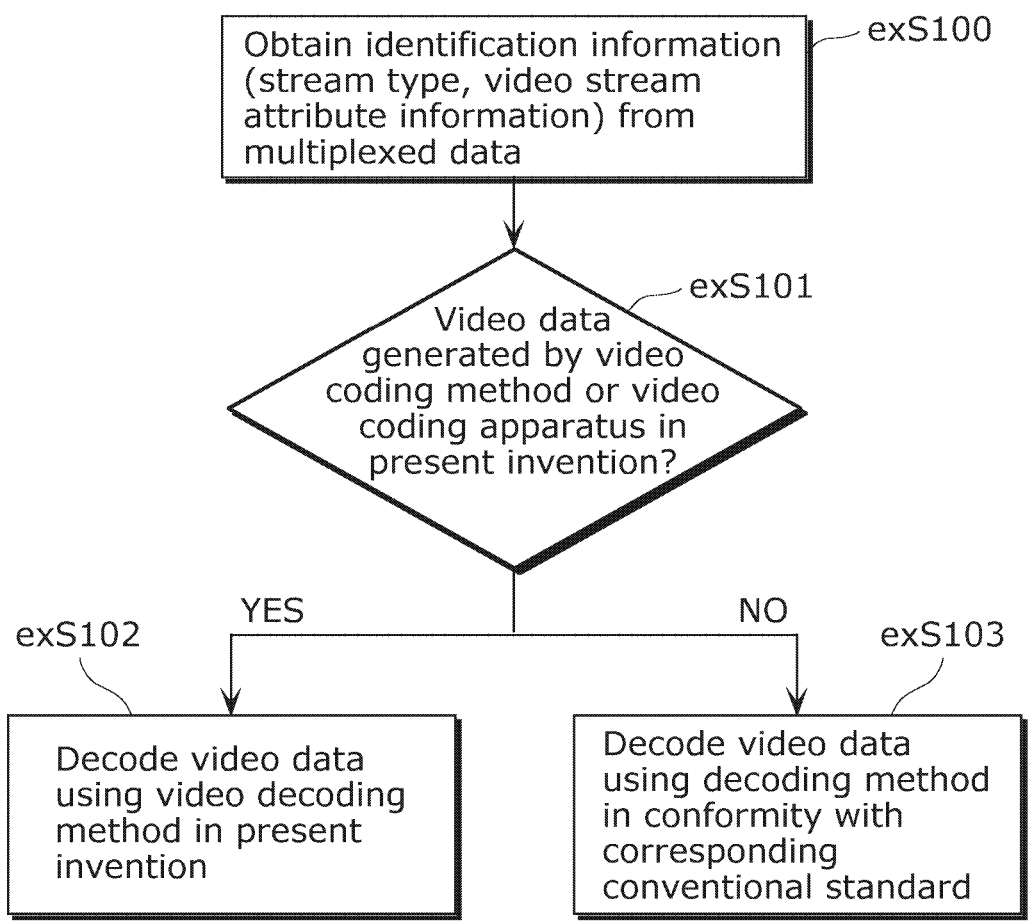
FIG. 33 shows steps for identifying video data.

Furthermore, FIG. 33 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

(Embodiment 6)

Figure 34:
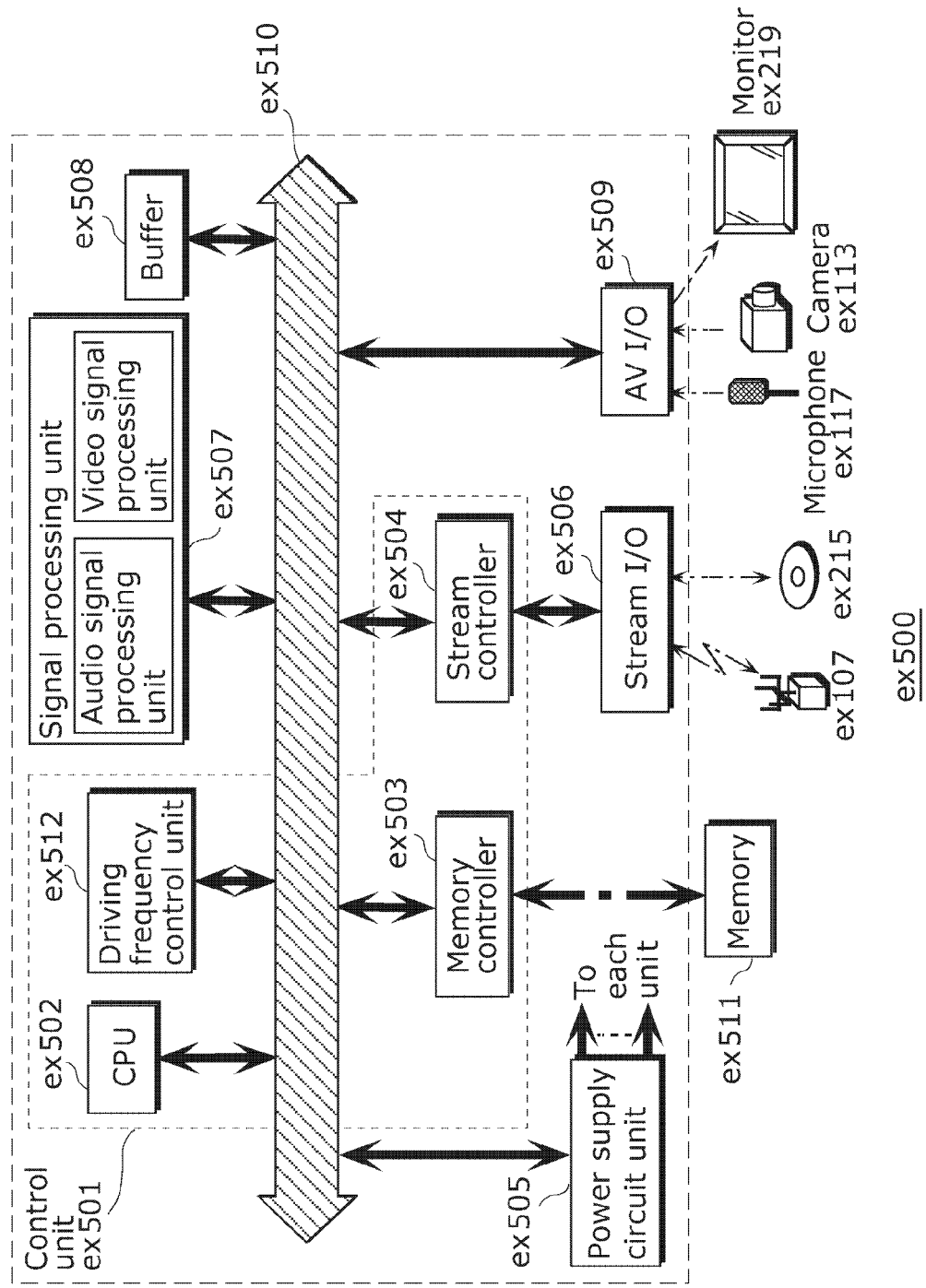
FIG. 34 shows an example of a configuration of an integrated circuit for implementing the moving picture coding method and the moving picture decoding method according to each of embodiments.
Figure 35:
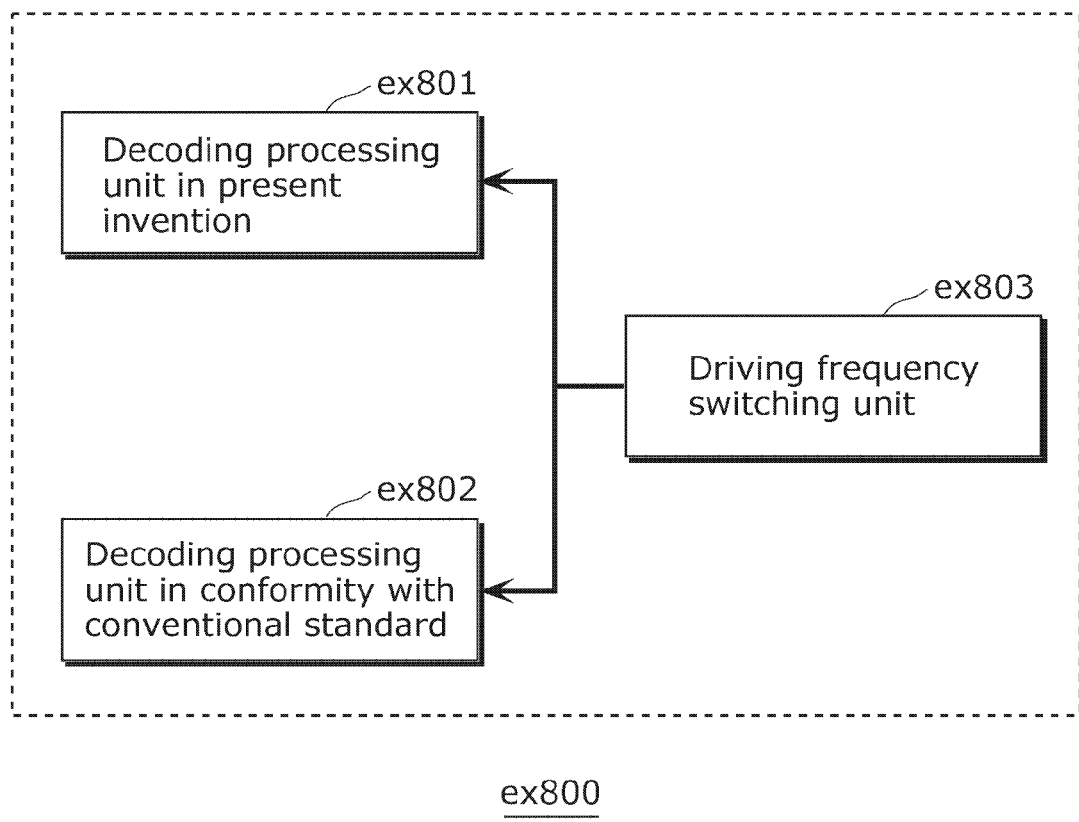
FIG. 35 shows a configuration for switching between driving frequencies.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

(Embodiment 7)

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the moving picture decoding apparatus, such as the television ex300 and the LSI ex500 is configured to determine to which standard the video data conforms, and switch between the driving frequencies according to the determined standard. FIG. 125 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
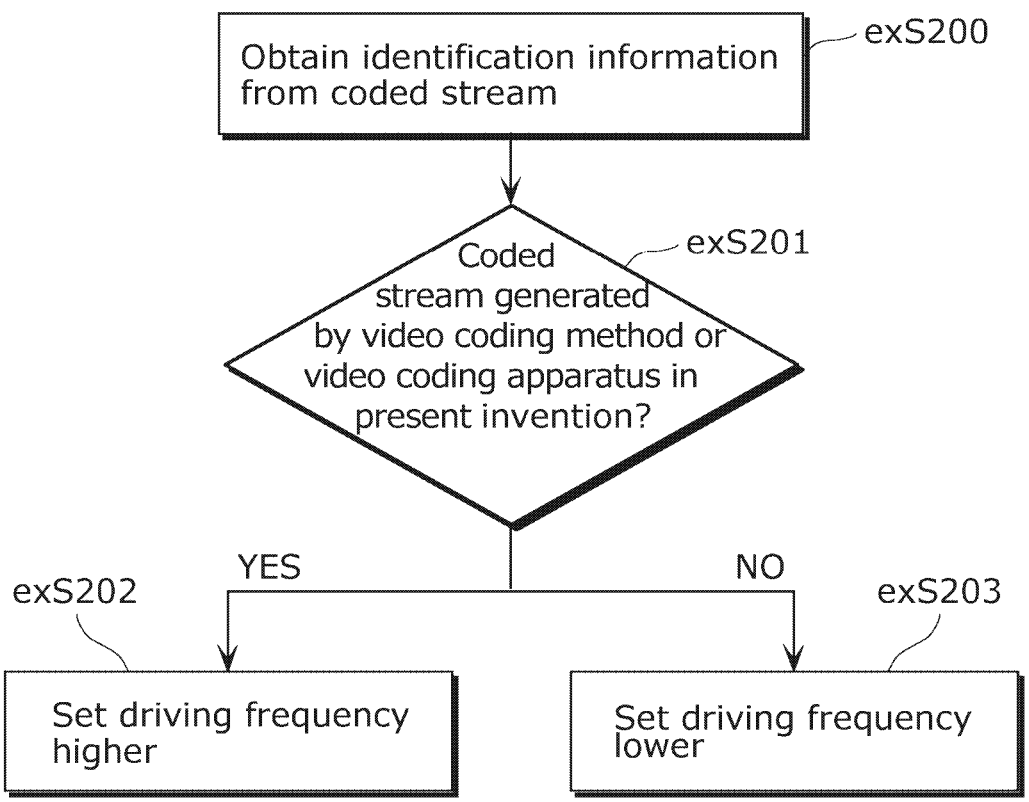
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS2O2, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower, For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 8)

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 38A:
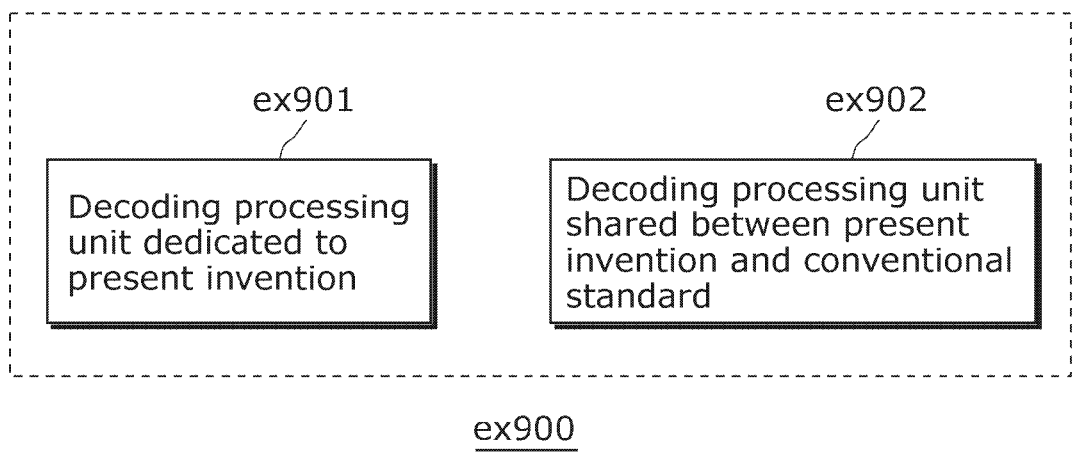
FIG. 38A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by inter prediction processing in particular, for example, the dedicated decoding processing unit ex901 is used for inter prediction processing. Otherwise, the decoding processing unit is probably shared for one of the entropy coding, deblocking filtering, orthogonal transformation, and quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 38B:
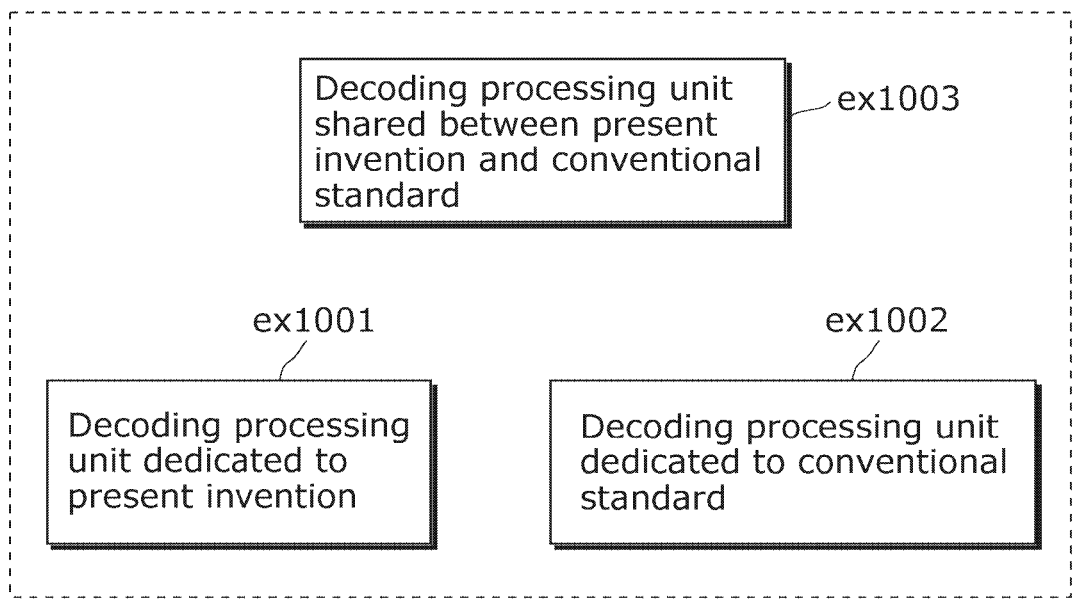
FIG. 38B is a diagram showing another example of a configuration for sharing a module of the signal processing unit.
Figure 39:
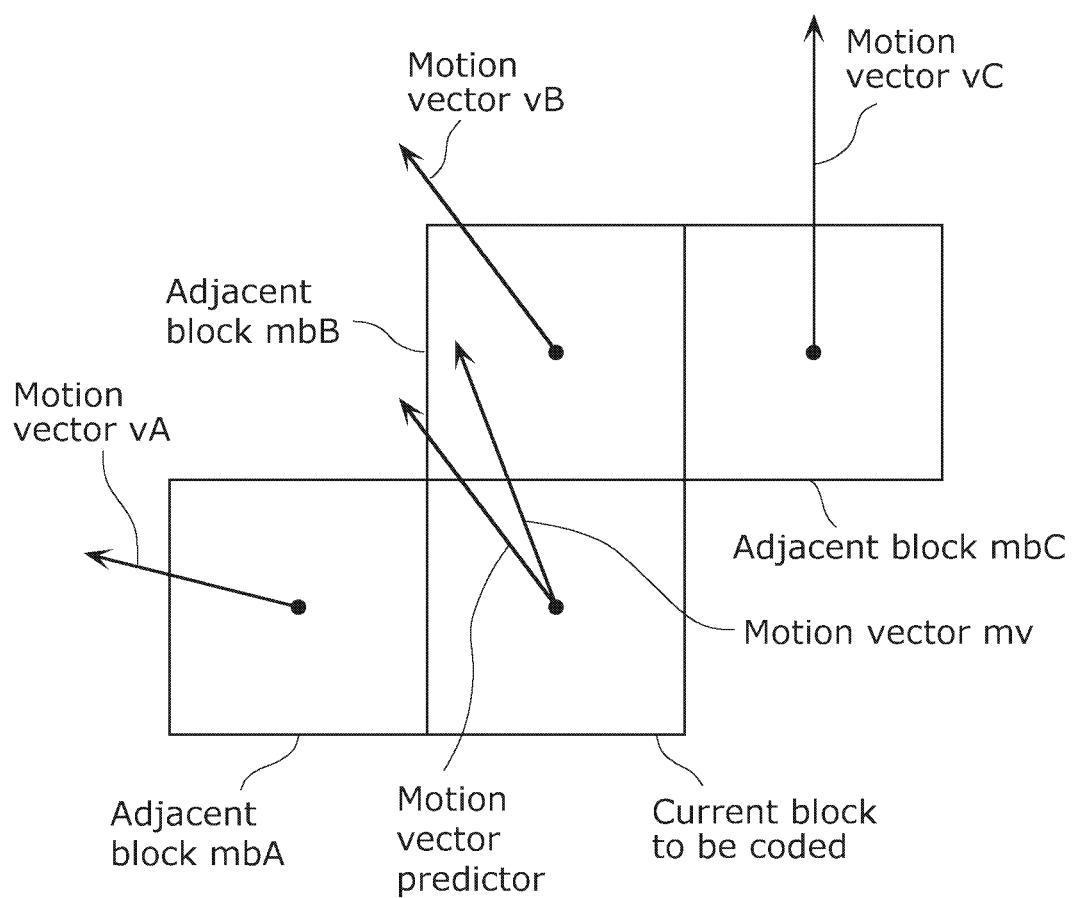
FIG. 39 is a diagram which illustrates a motion vector predictor according to a conventional technique.

Furthermore, ex1000 in FIG. 38B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The image coding method and the image decoding method according to the present disclosure are applicable to, for example, a television receiver, a digital video recorder, a car navigation, a mobile phone, a digital camera, a digital video camera, and so on.

REFERENCE SIGNS LIST 101 coding unit
102 subtractor
103 orthogonal transformation unit
104 quantization unit
105 variable length coding unit
106, 206 inverse quantization unit
107, 207 inverse orthogonal transformation unit
108, 208 adder
109, 209 block memory
110, 210 intra prediction unit
111, 211 frame memory
112, 212 inter prediction unit
113, 213 switch
121, 221 inter prediction control unit (selecting unit)
122, 222 disparity-motion-vector-predictor calculating unit (calculating unit)
123, 223 disparity-motion-vector-predictor addition determining unit (determining unit)
124 picture type determining unit
201 decoding unit
205 variable length decoding unit

The invention claimed is:

1. An image coding method for coding an image on a block-by-block basis, the method comprising:
  calculating a disparity motion vector predictor for predicting a motion vector of a current block to be coded, from a motion vector of a disparity block that is a block having a relationship of disparity with the current block and located at a position corresponding to a position of the current block;

selecting a motion vector predictor for use in prediction of the motion vector of the current block, from among one or more motion vector predictor candidates including the disparity motion vector predictor; and coding (i) identification information corresponding to the motion vector predictor selected from among the one or more motion vector predictor candidates and (ii) a motion vector difference that is a difference between the motion vector of the current block and the motion vector predictor, wherein in the coding, when the motion vector of the disparity block refers to a field having a relationship of same parity with the disparity block, a bitstream shorter than a bitstream of the case where the motion vector of the disparity block refers to a field having a relationship of disparity with the disparity block is allocated to identification information corresponding to the disparity motion vector predictor, to code the identification information corresponding to the disparity motion vector predictor.

2. The image coding method according to claim 1, wherein in the calculating, the disparity motion vector predictor is calculated from the motion vector of the disparity block included in a field located closest, in display order, to a field that includes the current block.

3. The image coding method according to claim 1, wherein in the calculating, the disparity motion vector predictor is calculated from the motion vector of the disparity block included in a picture that includes the current block.

4. The image coding method according to claim 1, further comprising determining whether or not the disparity motion vector predictor is to be included in the one or more motion vector predictor candidates, wherein in the selecting, when it is determined, in the determining, that the disparity motion vector predictor is to be included in the one or more motion vector predictor candidates, the motion vector predictor is selected from among the one or more motion vector predictor candidates including the disparity motion vector predictor.

5. The image coding method according to claim 4, wherein in the determining, when the motion vector of the disparity block refers to a field having a relationship of same parity with the disparity block, it is determined that the disparity motion vector predictor is to be included in the one or more motion vector predictor candidates.

6. The image coding method according to claim 1, wherein the coding further comprises coding (iii) the number of motion vector predictor candidates, out of the one or more motion vector predictor candidates, which are calculated respectively from motion vectors of blocks included in a field or a picture in which the current block is not included.

7. The image coding method according to claim 1, wherein in the calculating, the disparity motion vector predictor for predicting the motion vector of the current block is calculated from the motion vector of the disparity block included in a first view of the image that is a multiview video image, the current block being included in a second view different from the first view.

8. An image decoding method for decoding a coded image on a block-by-block basis, the method comprising:

calculating a disparity motion vector predictor for predicting a motion vector of a current block to be decoded, from a motion vector of a disparity block that is a block having a relationship of disparity with the current block and located at a position corresponding to a position of the current block;

decoding (i) identification information corresponding to a motion vector predictor selected in coding from among one or more motion vector predictor candidates including the disparity motion vector predictor and (ii) a motion vector difference that is a difference between the motion vector of the current block and the motion vector predictor; and selecting the motion vector predictor from among the one or more motion vector predictor candidates, using the identification information corresponding to the motion vector predictor, wherein in the decoding, when the motion vector of the disparity block refers to a field having a relationship of same parity with the disparity block, the identification information corresponding to the disparity motion vector predictor is decoded, based on a rule that a bitstream shorter than a bitstream of the case where the motion vector of the disparity block refers to a field having a relationship of disparity with the disparity block is allocated to identification information corresponding to the disparity motion vector predictor.

9. The image decoding method according to claim 8, wherein in the calculating, the disparity motion vector predictor is calculated from the motion vector of the disparity block included in a field located closest, in display order, to a field that includes the current block.

10. The image decoding method according to claim 8, wherein in the calculating, the disparity motion vector predictor is calculated from the motion vector of the disparity block included in a picture that includes the current block.

11. The image decoding method according to claim 8, further comprising determining whether or not the disparity motion vector predictor is to be included in the one or more motion vector predictor candidates, wherein in the selecting, when it is determined, in the determining, that the disparity motion vector predictor is to be included in the one or more motion vector predictor candidates, the motion vector predictor is selected from among the one or more motion vector predictor candidates including the disparity motion vector predictor.

12. The image decoding method according to claim 11, wherein in the determining, when the motion vector of the disparity block refers to a field having a relationship of same parity with the disparity block, it is determined that the disparity motion vector predictor is to be included in the one or more motion vector predictor candidates.

13. The image decoding method according to claim 11, wherein in the determining, when the motion vector of the disparity block is smaller than or equal to a threshold, it is determined that the disparity motion vector predictor is to be included in the one or more motion vector predictor candidates.

14. The image decoding method according to claim 8, wherein in the decoding, when the motion vector of the disparity block is smaller than or equal to a threshold, the identification information corresponding to the disparity motion vector predictor is decoded, based on a rule that a bitstream shorter than a bitstream of the case where the motion vector of the disparity block is larger than the threshold is allocated to identification information corresponding to the disparity motion vector predictor.

15. The image decoding method according to claim 8, wherein the coding further comprises decoding (iii) the number of motion vector predictor candidates, out of the one or more motion vector predictor candidates, which are calculated respectively from motion vectors of blocks included in a field or a picture in which the current block is not included.

16. The image decoding method according to claim 8, wherein in the calculating, the disparity motion vector predictor for predicting the motion vector of the current block is calculated from the motion vector of the disparity block included in a first view of the image that is a multiview video image, the current block being included in a second view different from the first view.

17. An image coding apparatus for coding an image on a block-by-block basis, the apparatus comprising:
- a calculating unit configured to calculate a disparity motion vector predictor for predicting a motion vector of a current block to be coded, from a motion vector of a disparity block that is a block having a relationship of disparity with the current block and located at a position corresponding to a position of the current block;
- a selecting unit configured to select a motion vector predictor for use in prediction of the motion vector of the current block, from among one or more motion vector predictor candidates including the disparity motion vector predictor; and
- a coding unit configured to code (i) identification information corresponding to the motion vector predictor selected from among the one or more motion vector predictor candidates and (ii) a motion vector difference that is a difference between the motion vector of the current block and the motion vector predictor,
- wherein the coding unit allocates, when the motion vector of the disparity block refers to a field having a relationship of same parity with the disparity block, a bitstream shorter than a bitstream of the case where the motion vector of the disparity block refers to a field having a relationship of disparity with the disparity block to identification information corresponding to the disparity motion vector predictor, and codes the identification information corresponding to the disparity motion vector predictor.

18. An image decoding apparatus for decoding a coded image on a block-by-block basis, the apparatus comprising:
- a calculating unit configured to calculate a disparity motion vector predictor for predicting a motion vector of a current block to be decoded, from a motion vector of a disparity block that is a block having a relationship of disparity with the current block and located at a position corresponding to a position of the current block;
- a decoding unit configured to decode (i) identification information corresponding to the motion vector predictor selected in coding from among one or more motion vector predictor candidates including the disparity motion vector predictor and (ii) a motion vector difference that is a difference between the motion vector of the current block and the motion vector predictor; and
- a selecting unit configured to select the motion vector predictor from among the one or more motion vector predictor candidates, using the identification information corresponding to the motion vector predictor,
- wherein the decoding unit decodes, when the motion vector of the disparity block refers to a field having a relationship of same parity with the disparity block, the identification information corresponding to the disparity motion vector predictor, based on a rule that a bitstream shorter than a bitstream of the case where the motion vector of the disparity block refers to a field having a relationship of disparity with the disparity block is allocated to identification information corresponding to the disparity motion vector predictor.

19. The image coding method according to claim 4, wherein in the determining, when the motion vector of the disparity block is smaller than or equal to a threshold, it is determined that the disparity motion vector predictor is to be included in the one or more motion vector predictor candidates.

20. The image coding method according to claim 1, wherein in the coding, when the motion vector of the disparity block is smaller than or equal to a threshold, a bitstream shorter than a bitstream of the case where the motion vector of the disparity block is larger than the threshold is allocated to identification information corresponding to the disparity motion vector predictor, to code the identification information corresponding to the disparity motion vector predictor.

* * * * *